(12) United States Patent
Fujikawa et al.

(10) Patent No.: US 9,860,479 B2
(45) Date of Patent: Jan. 2, 2018

(54) DISPLAY APPARATUS

(71) Applicant: FUNAI ELECTRIC CO., LTD., Osaka (JP)

(72) Inventors: Akihiro Fujikawa, Daito (JP); Shinji Morita, Higashiosaka (JP); Shinichi Kameoka, Higashiosaka (JP); Masayoshi Kobayashi, Hirakata (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 328 days.

(21) Appl. No.: 14/580,702

(22) Filed: Dec. 23, 2014

(65) Prior Publication Data

US 2015/0181732 A1    Jun. 25, 2015

(30) Foreign Application Priority Data

Dec. 25, 2013    (JP) .................................. 2013-267458
Dec. 25, 2013    (JP) .................................. 2013-267819
Dec. 27, 2013    (JP) .................................. 2013-271956

(51) Int. Cl.
| | |
|---|---|
| *G02F 1/13357* | (2006.01) |
| *H04N 5/64* | (2006.01) |
| *G02F 1/1335* | (2006.01) |
| *G02F 1/1333* | (2006.01) |
| *G06F 1/16* | (2006.01) |

(52) U.S. Cl.
CPC ......... *H04N 5/64* (2013.01); *G02F 1/133308* (2013.01); *G02F 1/133608* (2013.01); *G02F 2001/133314* (2013.01); *G06F 1/16* (2013.01); *G06F 1/1601* (2013.01)

(58) Field of Classification Search
CPC ............... H05K 5/0217; H05K 5/0221; H04N 5/64–5/65; G06F 1/16–1/1611; G02F 2001/133311–2001/133337; G02F 1/133608
See application file for complete search history.

(56) References Cited

U.S. PATENT DOCUMENTS

| | | | |
|---|---|---|---|
| 6,784,951 B2 | 8/2004 | Kuroki et al. | |
| 7,576,976 B2 | 8/2009 | Kawano | |
| 7,969,526 B2* | 6/2011 | Yang ................. | G02F 1/133308 349/187 |

(Continued)

FOREIGN PATENT DOCUMENTS

| | | |
|---|---|---|
| JP | 2002-140020 | 5/2002 |
| JP | 2005-241964 | 9/2005 |

(Continued)

*Primary Examiner* — Mariceli Santiago
(74) *Attorney, Agent, or Firm* — Wenderoth, Lind & Ponack, L.L.P.

(57) ABSTRACT

A display apparatus includes: a display unit; a front cabinet including a frame portion in the form of a frame surrounding an outer edge of the display unit, a tab including a base portion connected to the frame portion and extending in a depth direction from the base portion, and a fixing portion provided in the tab; and a rear frame, and the fixing portion is fixed to the rear frame with a fastener in a direction crossing the depth direction. The fixing portion may be located deeper in the depth direction than the display unit or may be closer to the display unit than the base position is in the direction crossing the depth direction.

16 Claims, 30 Drawing Sheets

(56) References Cited

U.S. PATENT DOCUMENTS

| | | | |
|---|---|---|---|
| 8,786,796 B2 | 7/2014 | Ito et al. | |
| 8,891,029 B2 | 11/2014 | Nakamura et al. | |
| 2002/0051102 A1 | 5/2002 | Kuroki et al. | |
| 2002/0113918 A1* | 8/2002 | Hiratsuka | G02F 1/133608 349/65 |
| 2008/0218954 A1 | 9/2008 | Kawano | |
| 2009/0225254 A1 | 9/2009 | Matsuzawa et al. | |
| 2010/0253874 A1 | 10/2010 | Ito et al. | |
| 2011/0051033 A1* | 3/2011 | Shimizu | G02F 1/133308 349/58 |
| 2011/0058349 A1* | 3/2011 | Jang | H05K 5/0017 361/829 |
| 2012/0300434 A1* | 11/2012 | Tien | G02F 1/133308 362/97.1 |
| 2013/0077014 A1* | 3/2013 | Yang | G02F 1/133308 349/58 |
| 2013/0088661 A1 | 4/2013 | Shin et al. | |
| 2013/0114005 A1 | 5/2013 | Suzuki et al. | |
| 2013/0201413 A1 | 8/2013 | Nakase | |
| 2014/0071378 A1* | 3/2014 | Zhou | G02B 6/0081 349/62 |
| 2014/0111706 A1 | 4/2014 | Nakamura et al. | |
| 2014/0133162 A1* | 5/2014 | Chen | G02F 1/133608 362/362 |
| 2014/0232946 A1 | 8/2014 | Ebata et al. | |
| 2014/0327855 A1* | 11/2014 | Tang | G02F 1/133308 349/58 |

FOREIGN PATENT DOCUMENTS

| | | |
|---|---|---|
| JP | 2006-58868 | 3/2006 |
| JP | 2008-216934 | 9/2008 |
| JP | 4210423 | 1/2009 |
| JP | 2009-134269 | 6/2009 |
| JP | 2009-171520 | 7/2009 |
| JP | 2009-244845 | 10/2009 |
| JP | 2011-170275 | 9/2011 |
| JP | 2013-17154 | 1/2013 |
| JP | 5122010 | 1/2013 |
| JP | 2013-33281 | 2/2013 |
| JP | 2013-83936 | 5/2013 |
| JP | 2013-85218 | 5/2013 |
| JP | 2013-122572 | 6/2013 |
| WO | 2012/096191 | 7/2012 |

\* cited by examiner

DISPLAY APPARATUS

CROSS REFERENCE TO RELATED APPLICATION

The present application is based on and claims priority of Japanese Patent Application No. 2013-271956 filed on Dec. 27, 2013, Japanese Patent Application No. 2013-267458 filed on Dec. 25, 2013, and Japanese Patent Application No. 2013-267819 filed on Dec. 25, 2013. The entire disclosure of the above-identified application, including the specification, drawings and claims is incorporated herein by reference in its entirety.

FIELD

The present invention relates to display apparatuses, and in particular to a structure for fixing a front cabinet.

BACKGROUND

A well-known display apparatus includes a display unit, a front cabinet in the shape of a frame surrounding an outer edge portion of the display unit, and a back cabinet covering a rear side of the display unit (for example, see patent literature (PTL) 1). In the display apparatus disclosed in PTL 1, the front cabinet and the back cabinet are joined together with fasteners (self-tapping screws) which are threadably engaged with the front cabinet by being inserted into screw through-holes of the back cabinet from the back.

CITATION LIST

Patent Literature

[PTL 1] Japanese Unexamined Patent Application Publication No. 2013-17154

SUMMARY

Technical Problem

Recent display apparatuses are desired to have a thinner frame as a front cabinet, that is, there is a demand for reduction in frame thickness, in order to increase the proportion of a display screen to the outer dimension of the display apparatuses. However, there is a problem that the display apparatus in PTL 1 has difficulty in reducing the frame thickness of the front cabinet.

The present invention is conceived in order to solve the aforementioned problem and aims to provide a display apparatus suitable for the reduction in frame thickness of the front cabinet,

Solution to Problem

A display apparatus according to an aspect disclosed includes: a display unit; a front cabinet including a frame portion surrounding an outer edge of the display unit, a tab including a base portion connected to the frame portion and extending in a depth direction from the base portion, and a fixing portion provided in the tab; and a rear frame, wherein the fixing portion is fixed to the rear frame with a fastener in a direction crossing the depth direction.

With this structure, the area of the fixing portion measured when the display apparatus is viewed from the front, that is, the area of the fixing portion projected onto the frame portion, can be smaller than the area of the fixing portion measured when viewed in an axial direction of the fastener. As a result, the frame thickness of the front cabinet that is to be reserved for the fixing portion is small as compared to the case where the front cabinet and the rear frame are fixed together in the depth direction, meaning that the display apparatus is reduced in frame thickness.

Furthermore, the fixing portion may be located deeper in the depth direction than the display unit.

With this structure, the fixing portion can be positioned so close to the display unit as to overlap with the display unit when the display apparatus is viewed from the front. As a result, the area of the fixing portion projected onto the frame portion can be small so that the frame thickness of the front cabinet can further be reduced.

Furthermore, the fixing portion is closer to the display unit than the base portion is in the direction crossing the depth direction.

With this structure, space is provided on the display unit side of the tab at the base portion, so that the base portion and the display unit are less likely to be interfered with each other. As a result, deterioration of image quality such as variations in displayed images due to the display unit being interfered with and pressed by the base portion is prevented, for example. Furthermore, less likelihood of interference between the base portion and the display unit allows the requirement of the dimensional accuracy for the front cabinet to be relaxed.

Furthermore, the tab may include a connecting portion which connects the base portion and the fixing portion by a step or a curve located deeper in the depth direction than the display unit.

With this structure, the tab extends farther in the depth direction than the display unit does, with the result that large space is formed on the display unit side of the base portion so that the interference between the base portion and the display unit can certainly be avoided.

Furthermore, it may be that the display apparatus further includes a cell guide positioned inside the front cabinet and holding the display unit, and the cell guide contacts the fixing portion in the direction crossing the depth direction and is away from the base portion.

With this structure, the base portion and the cell guide are less likely to interfere with each other. As a result, deterioration of image quality such as variations in displayed images due to the display unit being pressed by the base portion via the cell guide is prevented, for example.

Furthermore, the tab may include a lightening portion along a section of an outer edge of the fixing portion.

With this structure, the fixing portion is easy to warp and deform when being fixed to the rear frame, thereby relaxing the requirement of the dimensional accuracy for the front cabinet.

Furthermore, the lightening portion may be at least one of a notch or a slit.

With this structure, the lightening portion can take the form of a simple notch or slit instead of being made with a different material or a different thickness.

Furthermore, the front cabinet may include an engaging portion that engages the rear frame.

With this structure, rotational displacement of the front cabinet caused by torque for fastening the fastener is controlled by the engaging portion, so that the task of fixing the front cabinet to the rear frame is performed more efficiently.

Furthermore, it may be that the tab is formed integrally with the frame portion, and the fixing portion has a through-hole passing through the tab in the direction crossing the depth direction, and the fastener is inserted through the through-hole to fix the fixing portion to the rear frame.

With this structure, the tab and the fixing portion can be formed integrally with the front cabinet, meaning that there is no need to, for example, attach a separate fixing member having the tab and the fixing portion to the front cabinet, so that the increase in the number of components and the number of assembly steps can be reduced.

Furthermore, it may be that the display apparatus further includes a rear cabinet including a contiguous portion which is contiguous with an outer periphery of the front cabinet, and the tab is positioned inside the rear cabinet and located between the outer periphery and the display unit.

With this structure, it is possible to fix the front cabinet and the rear frame inside the rear cabinet without exposing the tab on the exterior of the display apparatus. This allows the front cabinet and the rear cabinet to have flexibility of design as appearance of the display apparatus. Furthermore, it is possible to prevent the fastener from being accidentally removed from the front cabinet.

Furthermore, it may be that at least a part of the rear frame is exposed as an exterior of the display apparatus, and the rear cabinet covers the fixing portion of the front cabinet.

With this structure, even in the case where the fastener and an end of the rear frame are directed outward in the display apparatus, the fixing portion is covered by the rear cabinet, thereby achieving favorable design and safety. Furthermore, since the rear frame is intentionally exposed on the exterior of the display apparatus, the size of the rear cabinet is reduced, leading to a reduction in material cost.

Furthermore, the rear cabinet may be made up of a plurality of cabinet sections.

With this structure, each of the cabinet sections is small, therefore contributing to a reduction in molding cost, as compared to the case of forming a single cabinet as the rear cabinet. Furthermore, the use of a suitable material for each of the cabinet sections can be an attempt to optimize the cost of such elements. Furthermore, dimensional variations in the cabinet sections can be absorbed at separating points of the cabinet sections.

Furthermore, it may be that the display apparatus further includes a circuit board attached to a back surface of the rear frame, and the rear cabinet further covers the circuit board.

With this structure, an attempt to optimize the cost of elements is possible, for example, by using costly flame-retardant resin for a part of the rear cabinet that covers the circuit board while using low-cost, not highly flame-retardant resin for a part of the rear cabinet that covers the tab.

Furthermore, it may be that the rear cabinet is fixed to the rear frame, the outer periphery of the front cabinet includes a facing portion, the contiguous portion of the rear cabinet includes a facing portion, the facing portions face each other, and at least one of the facing portions includes an interference portion which interferes with another one of the facing portions in the depth direction when the front cabinet is fixed to the rear frame and the rear cabinet is fixed to the rear frame.

With this structure, the front cabinet is warped and deformed by torque around the fixing portion, given from the interference portion, resulting in having an inner periphery closer to the display unit. This prevents the trouble that the gap between the inner periphery of the front cabinet and the display unit becomes too wide.

Furthermore, the interference portion may be a protrusion that is provided in at least one of the facing portions and protrudes toward the other one of the facing portions.

With this structure, the trouble that the gap between the inner periphery of the front cabinet and the display unit becomes too wide can be prevented by the use of the protrusion as the interference portion.

Furthermore, it may be that the facing portions extends in a form of a ring that surrounds the display unit, and the protrusion is provided over an entire circumference of the facing portions.

With this structure, the trouble that the gap between the inner periphery of the front cabinet and the display unit becomes too wide can be prevented over the entire circumference of the display unit. Furthermore, providing the protrusion continuously over the entire circumference of the facing portion gives good appearance that does not make a gap, irregularities, etc., stand out in the facing portion.

Furthermore, it may be that the protrusion is made up of a plurality of protrusions provided at intervals, and the protrusions increase in height with distance from the tab of the front cabinet along an outer edge of the front cabinet.

With this structure, variations in the displacement on the inner periphery of the front cabinet, in which the protrusion farther from the base portion causes less displacement on the inner periphery of the front cabinet, are canceled according to the heights of the protrusions. This allows the inner periphery of the front cabinet to be more uniformly close to the display unit.

Furthermore, it may be that the display apparatus further includes a cell guide positioned inside the front cabinet and holding the display unit, and when an inner periphery of the front cabinet reaches a position at a predetermined distance from the display unit due to interference in the facing portions, the cell guide comes into contact with the frame portion at a position closer to the display unit than to the base portion.

With this structure, it is possible to prevent the inner periphery of the front cabinet from coming too close to the display unit.

Advantageous Effects

With the present invention, it possible to provide a display apparatus suitable for reduction in frame thickness of the front cabinet.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

The inventors have found that the display apparatus stated in the background section is disadvantageous in reducing the frame thickness for the following reasons. Specifically, in the above display apparatus, the front cabinet and the back cabinet are fixed together with the fasteners from the back (i.e., in the depth direction). This requires the front cabinet to reserve, in a surface parallel to the display screen, a region for at least the greatest outside diameters of the heads of the fasteners, meaning that the region is a factor that impedes the frame thickness of the front cabinet from being reduced.

Diligent research and development by the inventors for a structure of a display apparatus having no such impeding factors for the reduction in frame thickness have produced the display apparatus disclosed hereinbelow.

The following describes exemplary embodiments in detail with reference to the Drawings. It should be noted that the Drawings conceptually illustrate features of the display apparatus; the dimensions and dimensional ratios of structural elements illustrated are not necessarily precise. Each of the exemplary embodiments described below shows a specific example of the present invention. The numerical values, shapes, materials, structural elements, the arrangement and connection of the structural elements etc. shown in the following exemplary embodiments are mere examples, and therefore do not limit the present invention. Among the structural elements in the following exemplary embodiments, structural elements not recited in any one of the independent claims are described as arbitrary structural elements.

(Embodiment 1)

Figure 1:
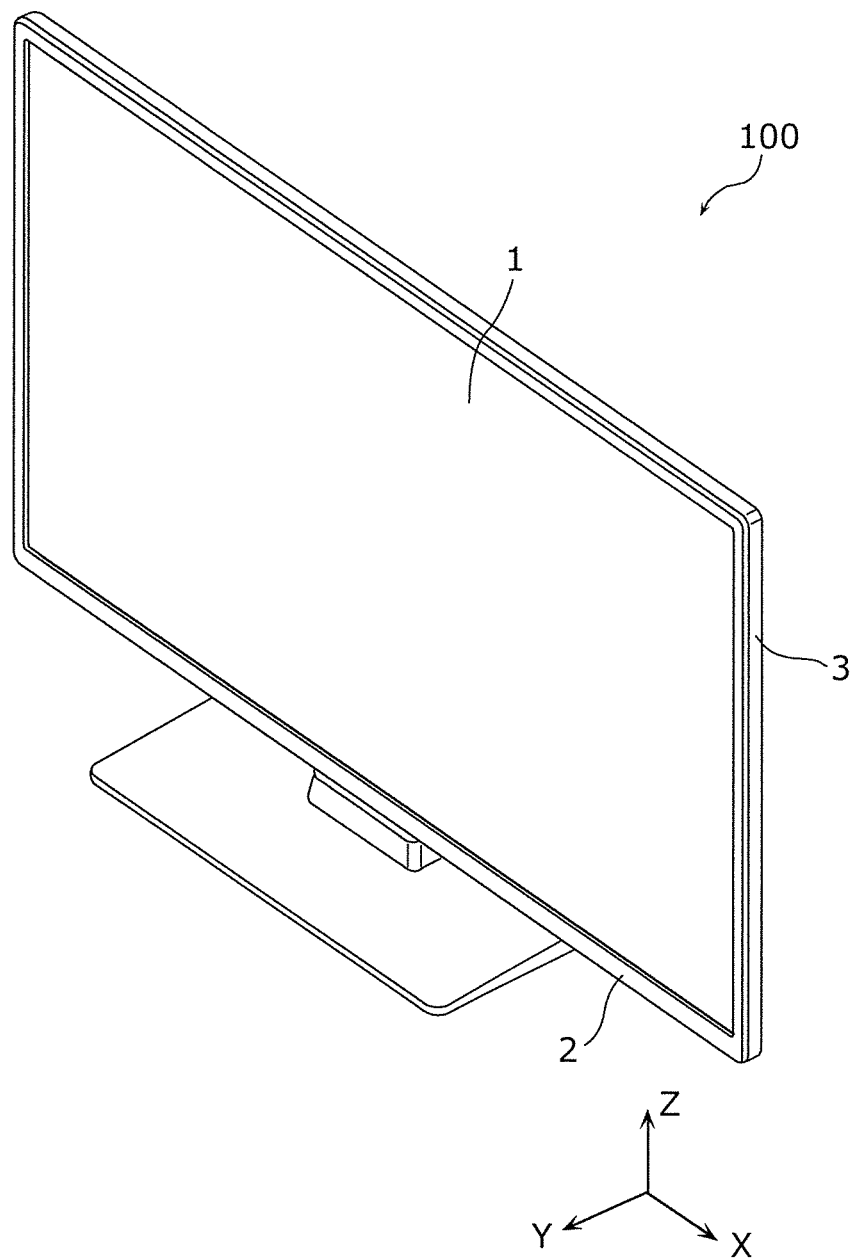
FIG. 1 is a perspective view illustrating an example of the appearance of a display apparatus according to Embodiment 1 to Embodiment 5.

A display apparatus according to Embodiment 1 has a casing structure suitable for the reduction in frame thickness of a front cabinet and is different from a conventional display apparatus in that the front cabinet and a rear frame are fixed together in a direction crossing the depth direction. The display apparatus according to Embodiment 1 is described in detail below, FIG. 1 is a perspective view illustrating an example of the appearance of the display apparatus according to Embodiment 1. In FIG. 1, a television receiver is illustrated as an example of a display apparatus 100. As illustrated in FIG. 1, the display apparatus 100 includes a display unit 1 and a front cabinet 2 and a rear cabinet 3 which house the display unit 1.

For the purpose of illustration, the left-and-right, front-and-back, and up-and-down directions when the display apparatus 100 is viewed from the front are defined herein as X axis direction, Y axis direction, and Z axis direction, respectively. With this definition, the Y axis direction is the depth direction, and each of the X axis direction and the Z direction is an example of the direction crossing the depth direction. In addition, to distinguish between forward and backward in each of the directions, the left-to-right, backto-front, and down-to-up directions when the display apparatus 100 is viewed from the front are denoted by +X axis direction, +Y axis direction, and +Z axis direction, respectively, and those opposite are denoted by −X axis direction, −Y axis direction, and −Z axis direction.

Here, the appearance of the display apparatus 100 illustrated FIG. 1 and the definitions of coordinate directions hold true in descriptions of display apparatuses according to the other exemplary embodiments.

Figure 2:
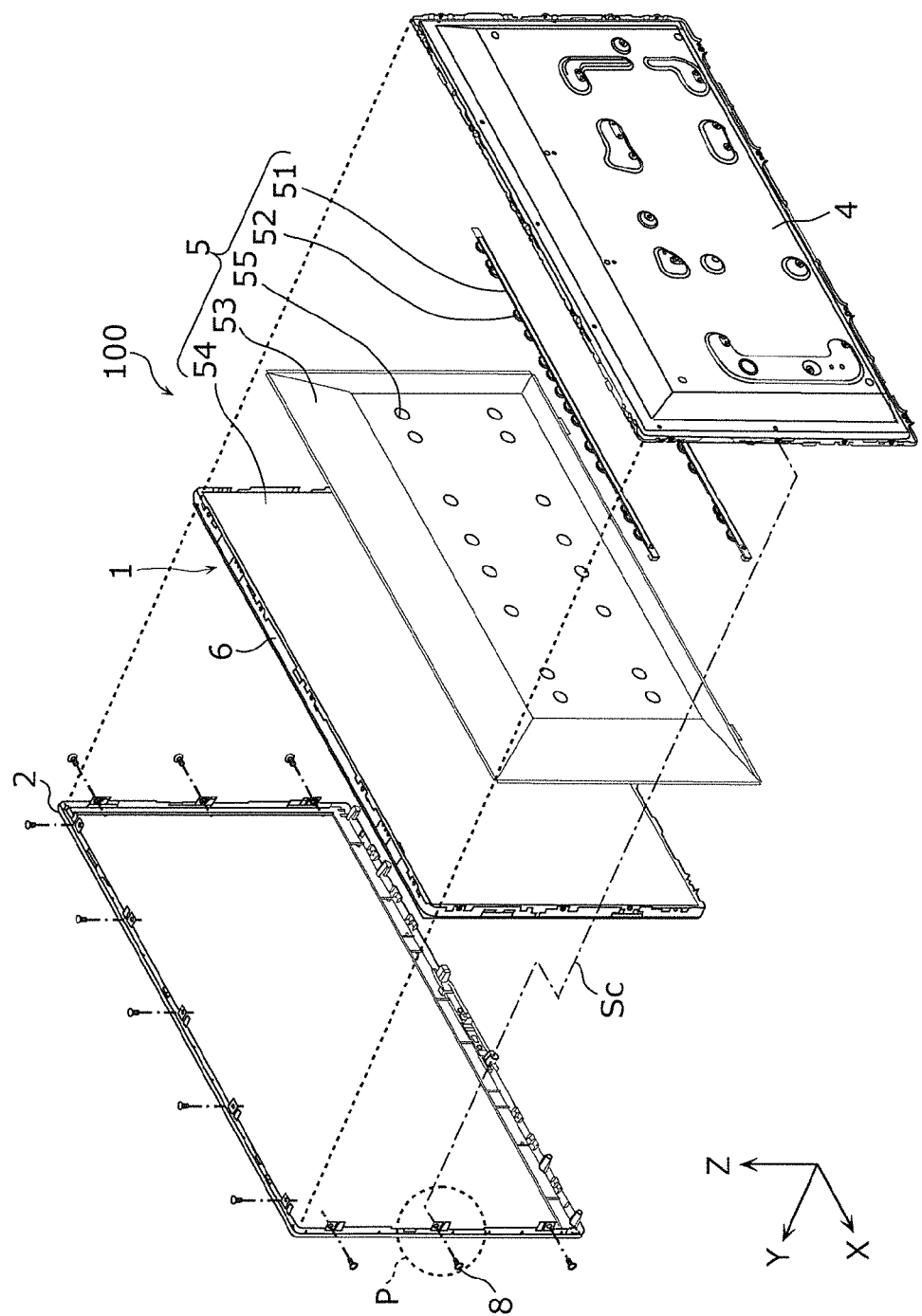
FIG. 2 is an exploded perspective view illustrating an example of the structure of a display apparatus according to Embodiment 1.

FIG. 2 is an exploded perspective view illustrating an example of the structure of the display apparatus 100 and gives illustrations of main structural elements of the display apparatus 100 viewed from the back. In FIG. 2, a back-lit liquid crystal display apparatus is illustrated as an example of the display apparatus 100.

As illustrated in FIG. 2, the display apparatus 100 includes, in addition to the above-mentioned display unit 1 and front cabinet 2, a rear frame 4, a light source unit 5, and a cell guide 6. The rear cabinet 3 is omitted in FIG. 2.

The display unit 1 displays an image on a display screen installed on a front surface thereof and, for example, may include liquid crystal cells.

The front cabinet 2 takes the form of a frame covering an outer edge of the display unit 1 from the front and is fixed at fixing points to the rear frame 4 with fasteners 8 in the direction of axis line Sc crossing the depth direction. The front cabinet 2 may, for example, be made from resin or a metal such as aluminum.

The rear frame 4 covers the display unit 1 from the back. To the rear frame 4, the front cabinet 2 is fixed and the rear cabinet 3 and a circuit board (not shown) are attached. The rear frame 4 may be a metal board, for example.

A structure for fixing the front cabinet 2 to the rear frame 4 will be described in detail later.

The cell guide 6 is positioned inside the front cabinet 2 and takes the form of a frame holding the display unit 1. The cell guide 6 may be made from resin, for example.

The light source unit 5 illuminates the display unit 1 and includes a plurality of light sources 52 attached to a holder 51, a reflective sheet 53, and an optical sheet 54.

The holder 51 may be an elongated circuit board, for example. The light sources 52 may be light emitting diodes, for example. The light sources 52 may protrude through openings 55 in the reflective sheet 53 to be positioned in front of the reflective sheet 53. Alternatively, the holder 51 as a whole may be positioned in front of the reflective sheet 53. The optical sheet 54 may include one or more functional sheets including a diffusion sheet, for example, and may be held on the back surface of the display unit 1 with the cell guide 6.

The light source unit 5 uniformly illuminates the display unit 1 from the back with light emitted from the light sources 52, reflected off the reflective sheet 53, and diffused by the optical sheet 54, Next, with the use of an example of a portion marked with a letter P in FIG. 2, the structure for fixing the front cabinet 2 to the rear frame 4 is described with reference to FIG. 3 to FIG. 6.

Figure 3:
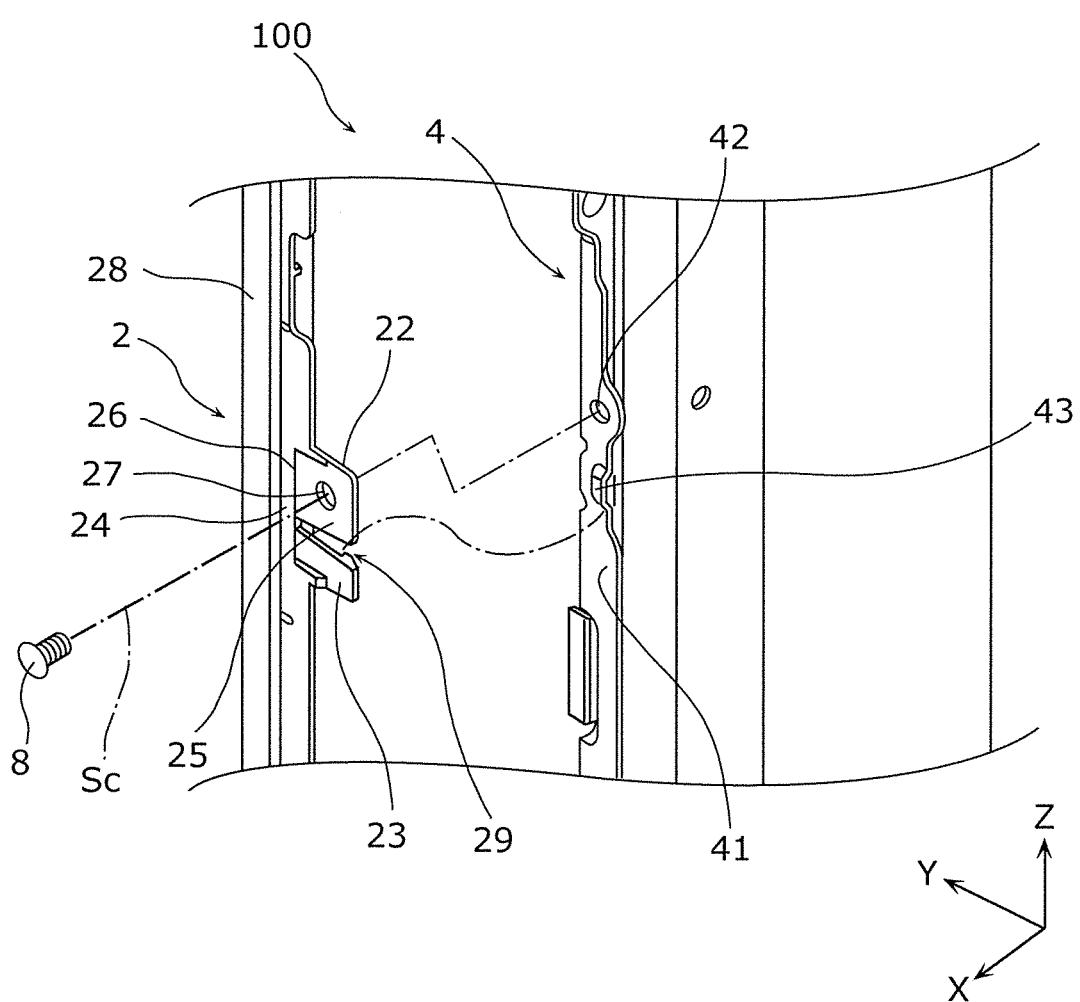
FIG. 3 is an exploded perspective view illustrating an example of the structures of a front cabinet and a rear frame according to Embodiment 1.

FIG. 3 is an exploded perspective view illustrating an example of the structures of the front cabinet 2 and the rear frame 4.

Figure 4:
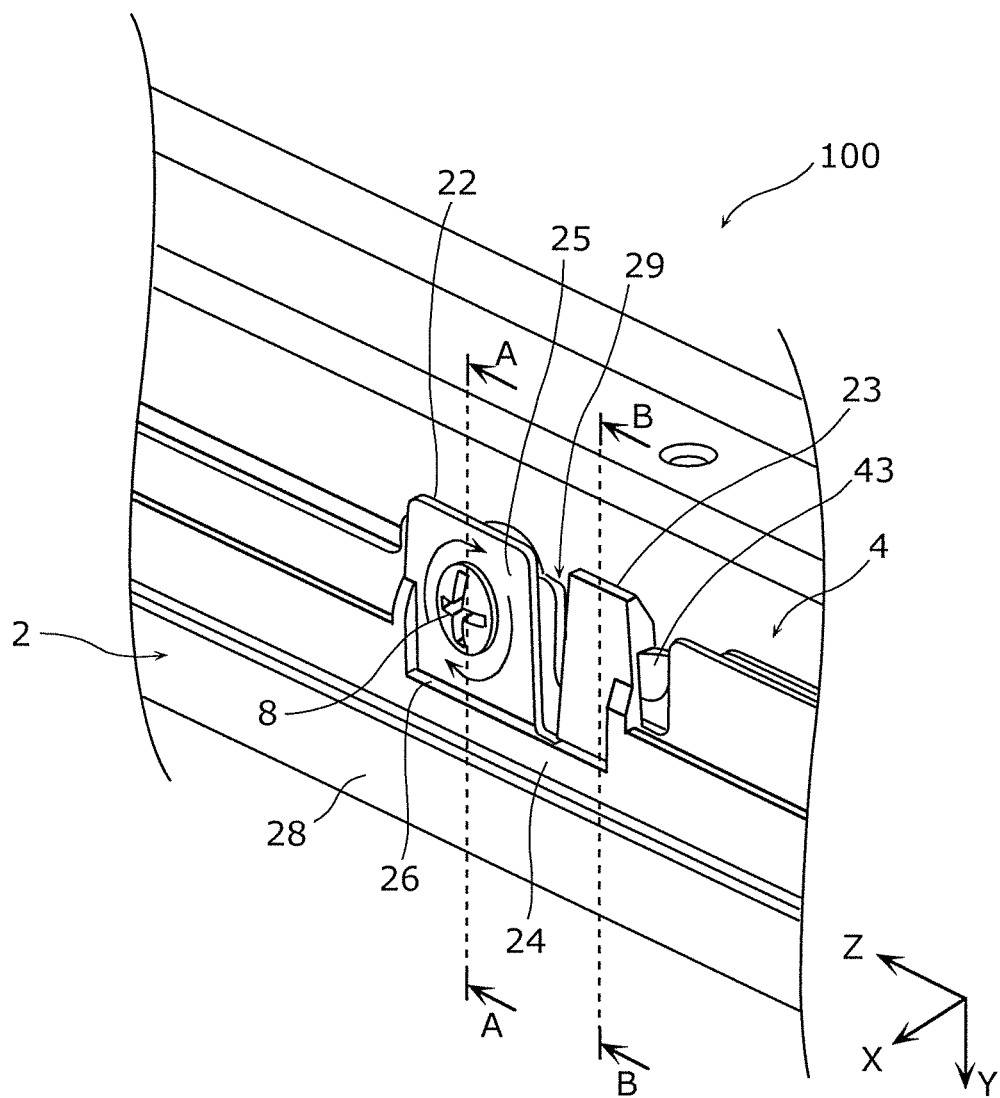
FIG. 4 is a perspective view illustrating an example of the structures of a front cabinet and a rear frame according to Embodiment 1.

FIG. 4 is a perspective view illustrating an example of the structures of the front cabinet 2 and the rear frame 4.

Figure 5:
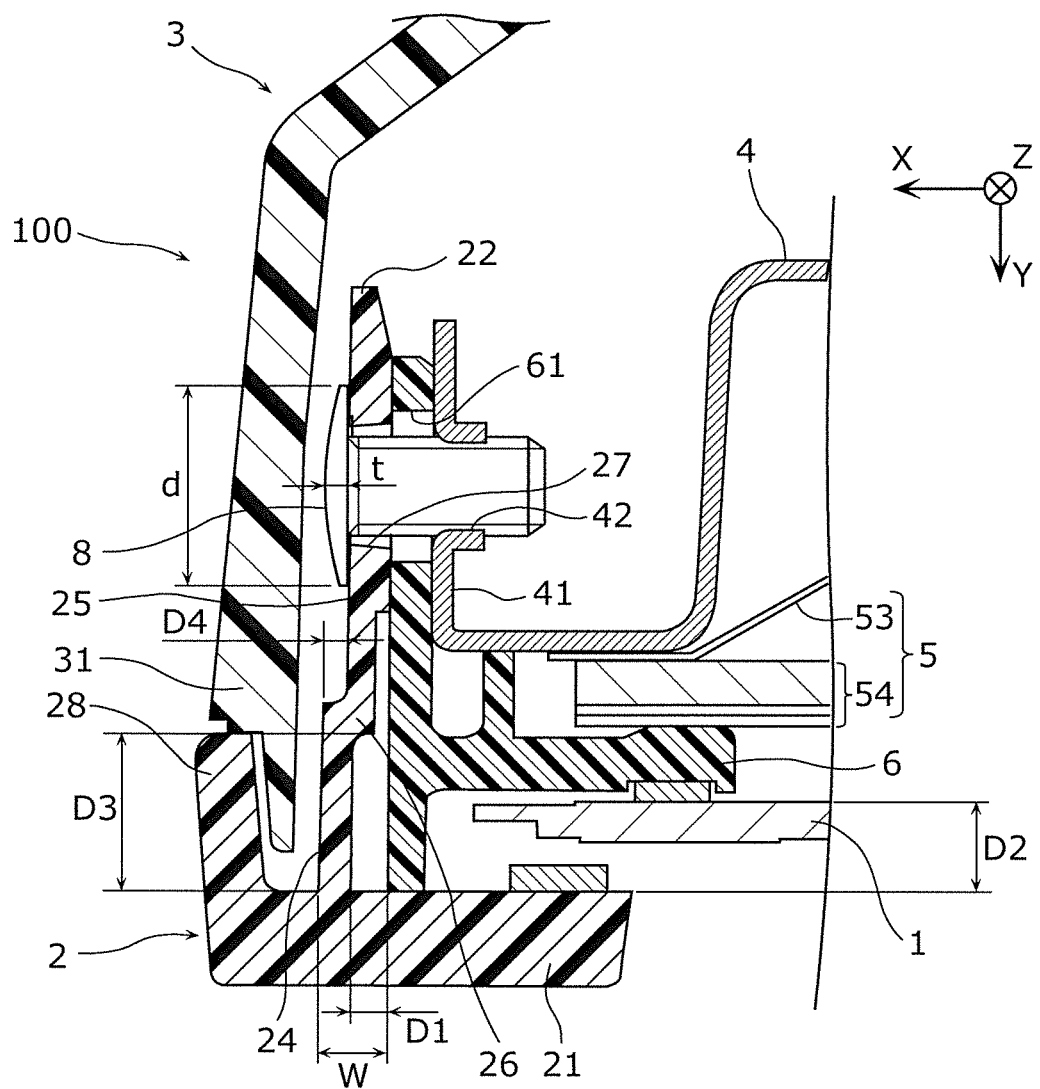
FIG. 5 is a cross-sectional view illustrating an example of the structures of a front cabinet and a rear frame according to Embodiment 1.

FIG. 5 is a cross-sectional view illustrating an example of the structures of the front cabinet 2 and the rear frame 4.

Figure 6:
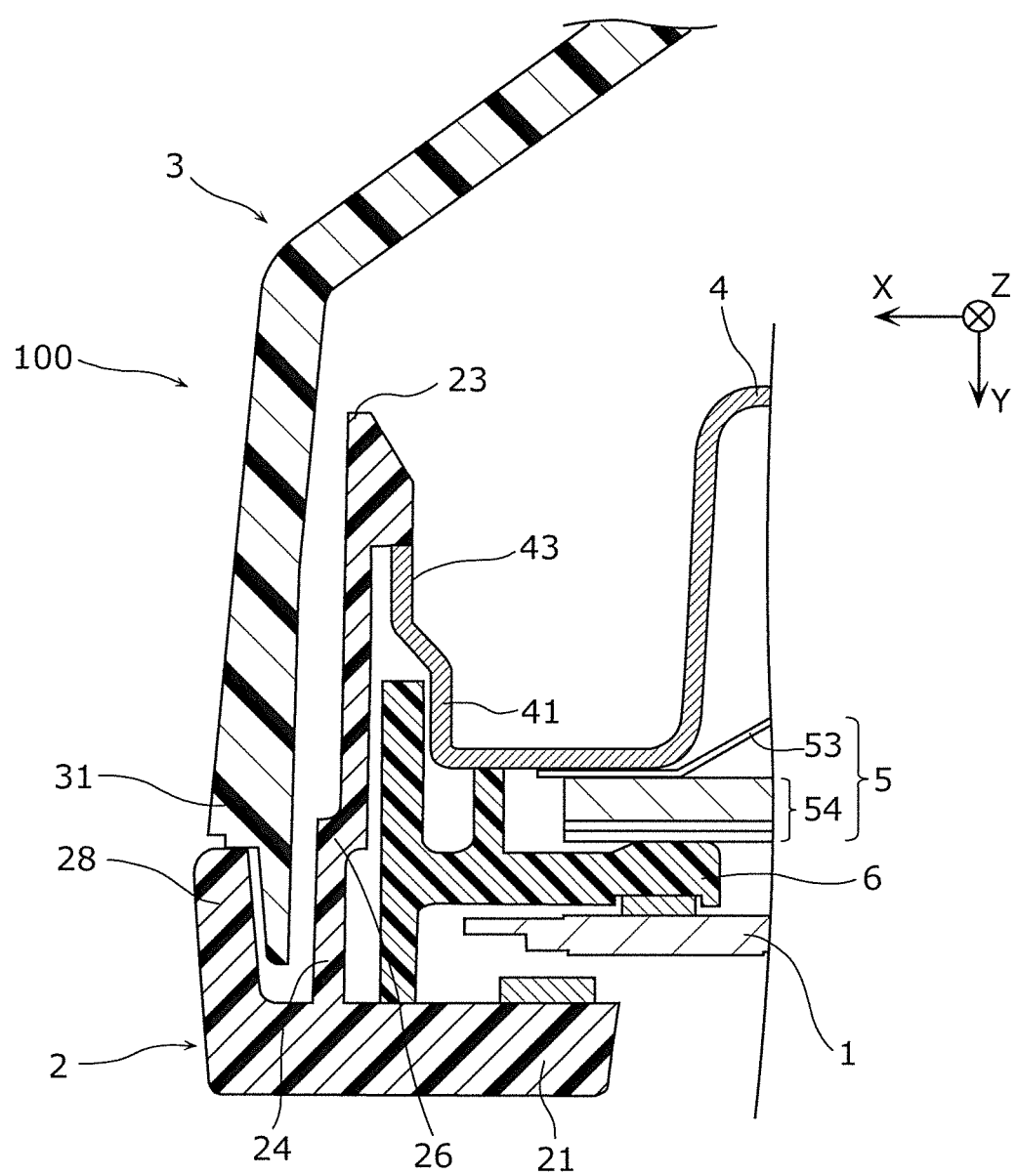
FIG. 6 is a cross-sectional view illustrating an example of the structures of a front cabinet and a rear frame according to Embodiment 1.

FIG. 6 is a cross-sectional view illustrating an example of the structures of the front cabinet 2 and the rear frame 4.

FIG. 3 to FIG. 6 are each an enlarged illustration of the portion P in FIG. 2. FIG. 5 and FIG. 6 respectively illustrate an A-A cross-section and a B-B cross-section indicated in FIG. 4, and include an illustration of the rear cabinet 3 for the sake of understanding.

As illustrated in FIG. 3 to FIG. 6, the front cabinet 2 includes: a frame portion 21 which surrounds the outer edge of the display unit 1; a tab 22 which extends in the depth direction (the −Y axis direction) from the frame portion 21; and an engaging portion 23, The tab 22 includes: a base portion 24 which connects to a portion of the back surface of the frame portion 21 of the front cabinet 2 other than an outer periphery and an inner periphery thereof; a fixing portion 25; and a connecting portion 26 which connects the base portion 24 and the fixing portion 25 by a step located deeper than the display unit 1. At the base portion 24, the tab 22 stands in the depth direction from the frame portion 21, The tab 22 includes a lightening portion 29 along a section of the outer edge of the fixing portion 25 (e.g., the boundary between the fixing portion 25 and the engaging portion 23). The lightening portion 29 may be a notch, for example. The fixing portion 25 has a through-hole 27 passing through the fixing portion 25 in a direction crossing the depth direction (that is in the −X axis direction at the "P" portion).

There structural elements of the front cabinet 2 may be formed integrally using resin in a mold, for example.

The cell guide 6 includes a portion in contact with the fixing portion 25 and has a through-hole 61 passing through the portion in a direction crossing the depth direction (that is in the −X axis direction at the "P" portion).

An outer periphery 41 of the rear frame 4 stands in the depth direction (in the −Y axis direction). The outer periphery 41 has a fixing hole 42 and includes an engaging portion 43. Raising the outer periphery 41 increases rigidity of the rear frame 4.

The front cabinet 2 and the cell guide 6 are fastened together to the rear frame 4 with the fasteners 8. The fasteners 8 may each be, for example, a screw that is inserted into the through-hole 27 and the through-hole 61 and threadably engaged with the threaded fixing hole 42. Instead of threading the fixing hole 42, it may also be possible to use a bolt and a nut as the fastener 8. The through-hole 27, the through-hole 61, and the fixing hole 42 are not limited to the holes and may be, for example, notches though which the axis of the fastener 8 passes.

The front cabinet 2 and the cell guide 6 hold the display unit 1 by pinching the outer periphery of the display unit 1. The engaging portion 23 of the front cabinet 2 engages the engaging portion 43 of the rear frame 4.

The rear cabinet 3 is fixed to the rear frame 4 with unillustrated fasteners. The rear cabinet 3 includes a contiguous portion 31 which is contiguous with an outer periphery 28 of the front cabinet 2. The tip of the contiguous portion 31 of the rear cabinet 3 may be inserted between the outer periphery 28 and the base portion 24 of the front cabinet 2, At the "P" portion, the front cabinet 2 is fixed to the rear frame 4 in a direction crossing the depth direction with such a structure.

The outer periphery of the display apparatus 100 has mutually separated fixing points having the same structure as the "P" portion. In FIG. 2, there are three fixing points (including the "P" portion) on the right side, three fixing points on the left side, and five fixing points on the upper side when the display apparatus 100 is viewed from the front.

The direction in which the front cabinet 2 is fixed to the rear frame 4 (that is, the direction referred to as the direction crossing the depth direction) is different depending on the fixing point; the directions at the fixing points on the right side, the left side, and the upper side of the display apparatus 100 are the −X axis direction, the +X axis direction, and the −Z axis direction, respectively. Hereinafter, for the purpose of unifying representations, there are cases where a direction toward the display unit 1 is referred to as inward or inside and a direction outward from the display unit 1 is referred to as outward or outside among the directions referred to as the directions crossing the depth direction at the respective fixing points.

A detailed structure of the display apparatus 100 and effects obtained by such a structure are described in detail, where appropriate, with reference to dimensions of the main parts illustrated in FIG. 5.

The fixing portion 25 of the front cabinet 2 is fixed to the rear frame 4 with the fasteners 8 in a direction crossing the depth direction.

With this, the area of the fixing portion 25 when the display apparatus 100 is viewed from the front, that is, the area of the fixing portion 25 projected onto the frame portion 21, is smaller than the area of the fixing portion 25 when viewed in an axial direction of the fastener 8. Specifically, suppose that the width of the fixing portion 25 projected onto the frame portion 21 is W, and this width W is smaller than the greatest outside diameter d of the fastener 8, that is, the outer diameter of the head of the fastener 8.

As a result, the frame thickness of the front cabinet 2 that is to be reserved as the frame portion 21 is small as compared to the case where the front cabinet 2 and the rear frame 4 are fixed together in the depth direction. This means that the reservation of a relatively small region having the width W for the frame portion 21 is sufficient to allow the front cabinet 2 to be fixed to the rear frame 4, with the result that the reduction in frame thickness of the display apparatus 100 is achieved.

Furthermore, the fixing portion 25 is located deeper in the depth direction than the display unit 1. Accordingly, the fixing portion 25 can be positioned so close to the display unit 1 as to overlap with the display unit 1 when the display apparatus 100 is viewed from the front. As a result, the area of the fixing portion 25 projected onto the frame portion 21 can be small so that the frame thickness of the front cabinet 2 can further be reduced.

Furthermore, the fixing portion 25 is closer to the display unit 1 than the base portion 24 is in a direction crossing the depth direction. In order to lead to such an arrangement, the tab 22 stands in the depth direction from the base portion 24 connected to the frame portion 21, and the fixing portion 25 and the base portion 24 are connected by the step of the connecting portion 26.

Specifically, the step of the connecting portion 26 is located deeper than the back surface of the frame portion 21 by a distance D3. The distance D3 is greater than a distance D2 which is the distance from the back surface of the frame portion 21 to the back surface of the display unit 1. An inside surface of the fixing portion 25 is located inside relative to an inside surface of the base portion 24 by a distance D1.

The step of the connecting portion 26 provides space of the size defined by the width D1 and the depth D3 on the display unit 1 side of the base portion 24. With the space provided on the display unit 1 side of the base portion 24, the base portion 24 and the display unit 1 are less likely to interfere with each other.

As a result, deterioration of image quality such as variations in displayed images due to the display unit 1 being interfered with the base portion 24 and pressed by the base portion 24 is prevented. Furthermore, less likelihood of interference between the display unit 1 and the base portion 24 allows the requirement of the dimensional accuracy for the front cabinet 2 to be relaxed. Depending on the shape of the tab 22 standing in the depth direction from the frame portion 21 at the base portion 24, larger space is provided on the display unit 1 side of the base portion 24.

The cell guide 6 contacts the fixing portion 25 in a direction crossing the depth direction and is away from the base portion 24.

With this, the base portion 24 and the cell guide 6 are less likely to interfere with each other. As a result, deterioration of image quality such as variations in displayed images due to the display unit 1 being pressed by the base portion 24 via the cell guide 6 is prevented, for example.

Furthermore, because of the step of the connecting portion 26, an outside surface of the fixing portion 25 is located inside relative to an outside surface of the base portion 24 by a distance D4.

This reduces an amount of protrusion of the fastener 8 outward from the tab 22 for thickness t of the head of the fastener 8.

The tab 22 includes the lightening portion 29 along a section of the outer edge of the fixing portion 25. The lightening portion 29 in the display apparatus 100 is a notch that extends from the tip of the tab 22 to around the connecting portion 26 along the boundary between the fixing portion 25 and the engaging portion 23. Thus, the fixing portion 25 and the engaging portion 23 are connected as one body at the connecting portion 26 and the base portion 24 and are separated at a portion closer to the tip than the connecting portion 26 is.

With the lightening portion 29, the fixing portion 25 is easy to warp and deform by axial force of the fastener 8, thereby relaxing the requirement of the dimensional accuracy for the front cabinet 2.

The engaging portion 23 has a tip in the shape of a hook; the tip of the engaging portion 23 engages the engaging portion 43 of the rear frame 4. This prevents positional displacement of the fixing portion 25 with respect to the rear frame 4 that is caused by torque for fastening the fastener 8 at the time of fixing the fixing portion 25 to the rear frame 4, resulting in efficient work of fixing the front cabinet 2 to the rear frame 4.

The tab 22 and the engaging portion 23 are positioned inside the rear cabinet 3 and located between the outer periphery 28 and the display unit 1.

Therefore, the whole fixing point including the tab 22 and the engaging portion 23 is not exposed on the exterior of the display apparatus 100; the front cabinet 2 and the rear frame 4 are fixed together inside the rear cabinet 3. As a result, the front cabinet 2 and the rear cabinet 3 can be given flexibility of design as appearance of the display apparatus 100. Furthermore, it is possible to prevent the fastener 8 from being accidentally removed from the front cabinet 2.

It should be noted that the connecting portion does not always need to be in the form of a step and may be, for example, a curve. The following describes an example of the display apparatus including the connecting portion in the form of a curve.

Figure 7:
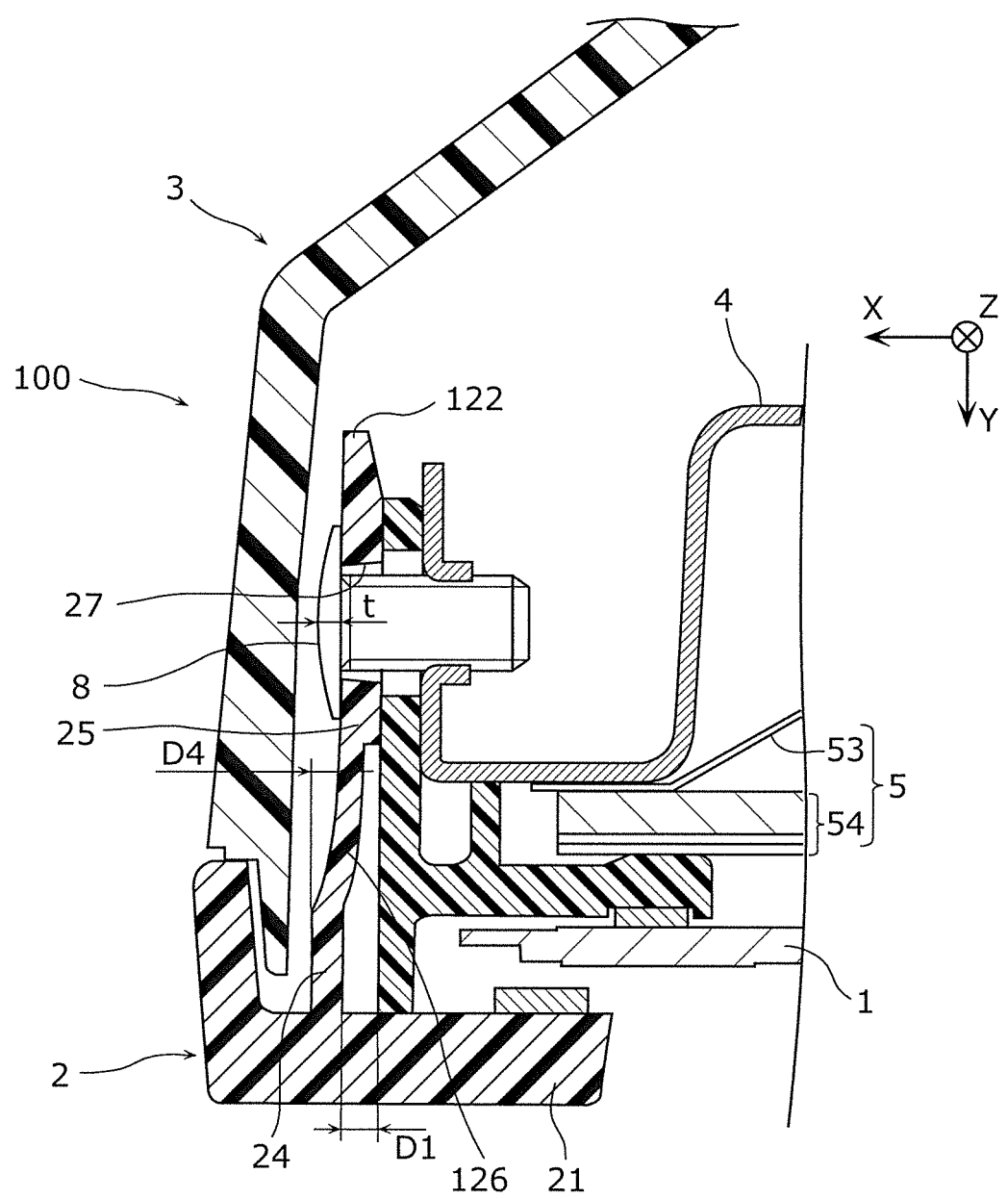
FIG. 7 is a cross-sectional view illustrating an example of the structures of a front cabinet and a rear frame according to Embodiment 1.

FIG. 7 is a cross-sectional view illustrating another example of the structures of the front cabinet 2 and the rear frame 4. A tab 122 illustrated in FIG. 7 is different from the tab 22 illustrated in FIG. 5 in that a connecting portion 126 is in the form of a curve instead of a step. The connecting portion 126 connects the base portion 24 and the fixing portion 25 by a curve located deeper than the display unit 1.

In FIG. 7, with the curve of the connecting portion 126, the inside surface of the fixing portion 25 is located inside relative to the inside surface of the base portion 24 by the distance D1, and the outside surface of the fixing portion 25 is located inside relative to the outside surface of the base portion 24 by the distance D4.

The curve of the connecting portion 126 provides space of the size defined by the width D1 on the display unit 1 side of the base portion 24. With the space provided on the display unit 1 side of the base portion 24, the base portion 24 and the display unit 1 are less likely to interfere with each other. This reduces an amount of protrusion of the fastener 8 outward from the tab 122 for the thickness t of the head of the fastener 8.

Therefore, also in the case where the connecting portion 126 is in the form of a curve, the base portion 24 and the display unit 1 are less likely to interfere with each other, with the result that the requirement of the dimensional accuracy for the front cabinet 2 is relaxed, and deterioration of image quality is prevented, as in the case where the connecting portion 26 is in the form of a step.

Next, the state in which the front cabinet and the rear frame structured as above are fixed together is described using an example of the display apparatus 100 in which the connecting portion 126 is in the form of a curve.

Figure 8:
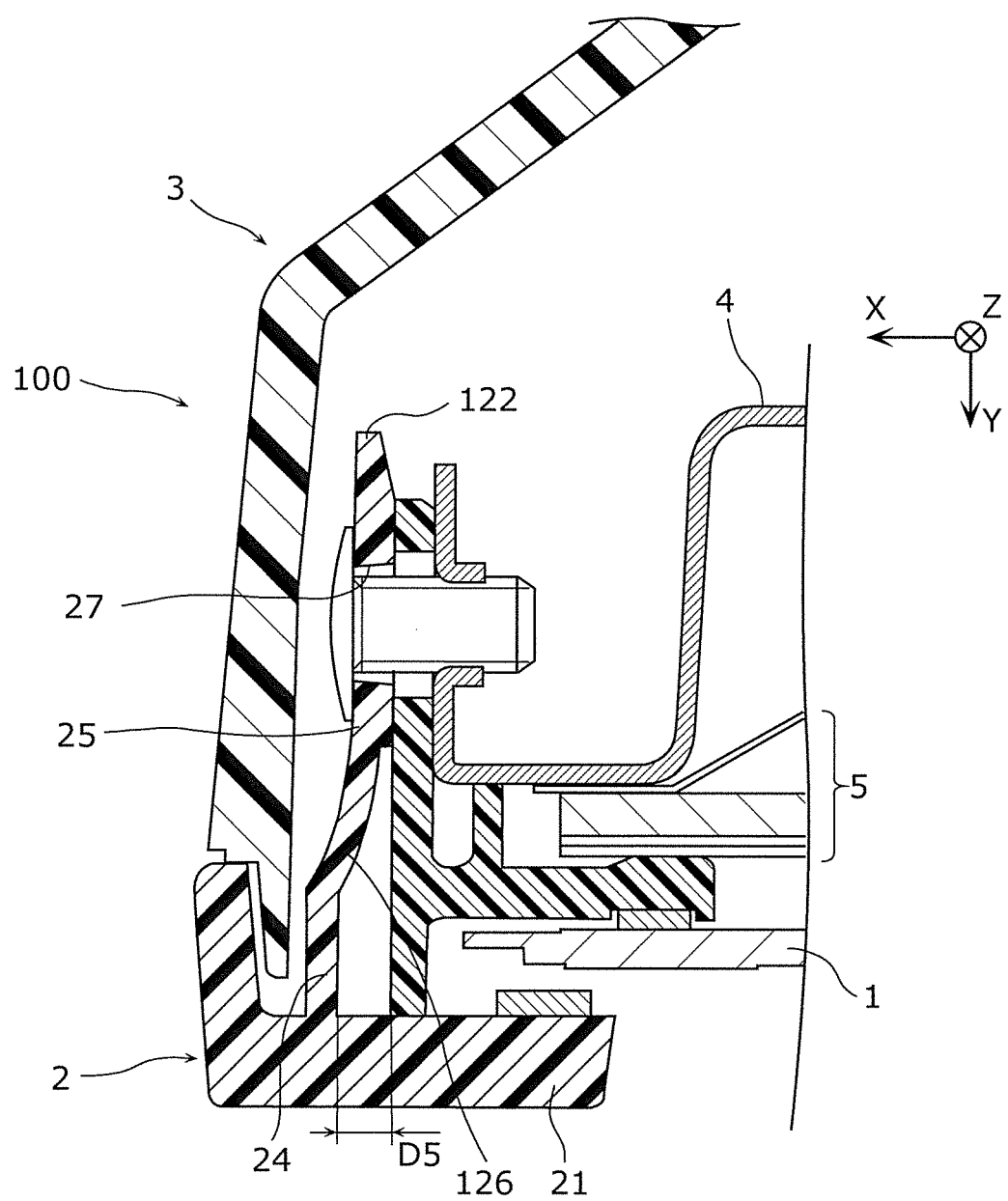
FIG. 8 is a cross-sectional view for explaining the state in which a front cabinet and a rear frame according to Embodiment 1 are fixed together.
Figure 9:
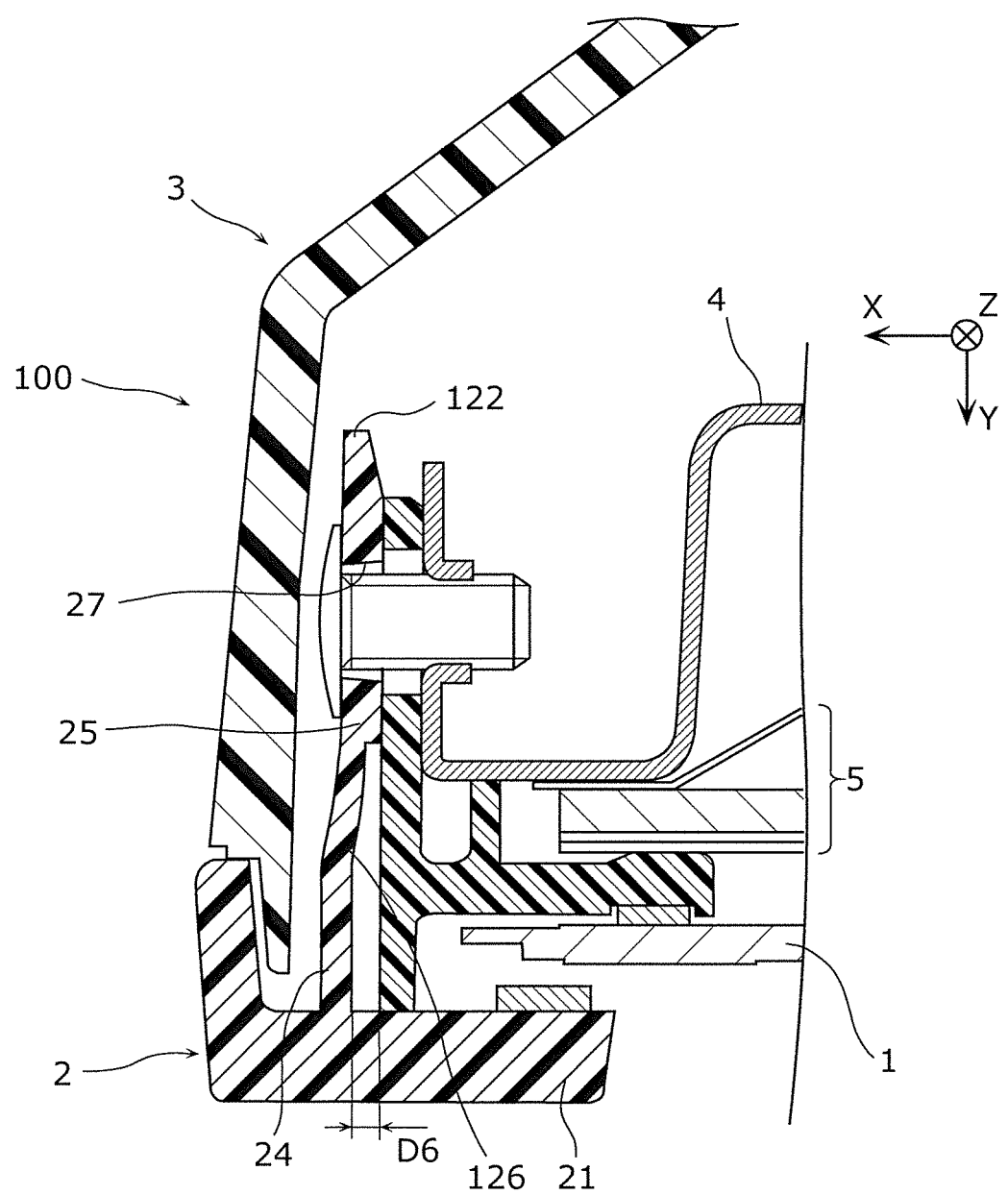
FIG. 9 is a cross-sectional view for explaining the state in which a front cabinet and a rear frame according to Embodiment 1 are fixed together.

FIG. 8 and FIG. 9 are cross-sectional views for explaining the state in which the front cabinet 2 and the rear frame 4 are fixed together. Suppose that FIG. 7 illustrates the state in which the front cabinet 2 of a standard size is fixed to the rear frame 4, then FIG. 8 illustrates the state in which the front cabinet 2 of the maximum allowable size is fixed to the rear frame 4, and FIG. 9 illustrates the state in which the front cabinet 2 of the minimum allowable size is fixed to the rear frame 4.

As illustrated in FIG. 8, when the front cabinet 2 is of a size larger than the standard size, a distance D5 which is a distance from the inside surface of the base portion 24 to the inside surface of the fixing portion 25 is greater than the distance D1 indicated in FIG. 7. Therefore, the fixing portion 25 warps inward by axial force of the fastener 8 and is fixed with stress acting thereon that presses the fixing portion 25 against the rear frame 4.

As illustrated in FIG. 9, when the front cabinet 2 is of a size smaller than the standard size, a distance D6 which is a distance from the inside surface of the tab 22 to the inside surface of the fixing portion 25 is less than the distance D1 indicated in FIG. 7. Therefore, the fixing portion 25 warps outward by interference with the rear frame 4 and is fixed with stress acting thereon that the rear frame 4 presses the fixing portion 25 back.

Especially, when the front cabinet 2 is of a size smaller than the standard size, the base portion 24 is less likely to interfere with the cell guide 6 as a result of space being provided on the display unit 1 side of the base portion 24. Consequently, deterioration of image quality such as variations in displayed images due to the display unit 1 being pressed by the base portion 24 via the cell guide 6 is prevented.

Thus, the warping of the tab 22 absorbs dimensional variations of the front cabinet 2 and furthermore, space provided on the display unit 1 side of the base portion 24 prevents deterioration of image quality that is caused by interference of components which is likely to occur in the case where the front cabinet 2 is of a size smaller than the standard size. In the case of being made from resin, the front cabinet 2 will inevitably have variations in external dimension to some extent, meaning that the requirement of the dimensional accuracy being relaxed is of high practical significance.

The display apparatus 100 structured as above achieves the reduction in frame thickness, which is a main effect, as a result of the front cabinet 2 and the rear frame 4 being fixed together in a direction crossing the depth direction. Furthermore, characteristic shapes of the detailed portions allow the frame thickness of the front cabinet 2 to be further reduced and in addition, produce advantageous effects such as prevention of deterioration of image quality that is caused by interference of the components, and relaxed requirements of the dimensional accuracy for the components.

(Variation of Embodiment 1)

The above-described structure of the display apparatus 100 is a mere example; any modifications conceivable by those skilled in the art may be applied to the detailed portions of the display apparatus as long as the same or similar effects to the above-described effects are obtained. Some modifications to the detailed portions of the display apparatus according to Embodiment 1 are described below.

Figure 10:
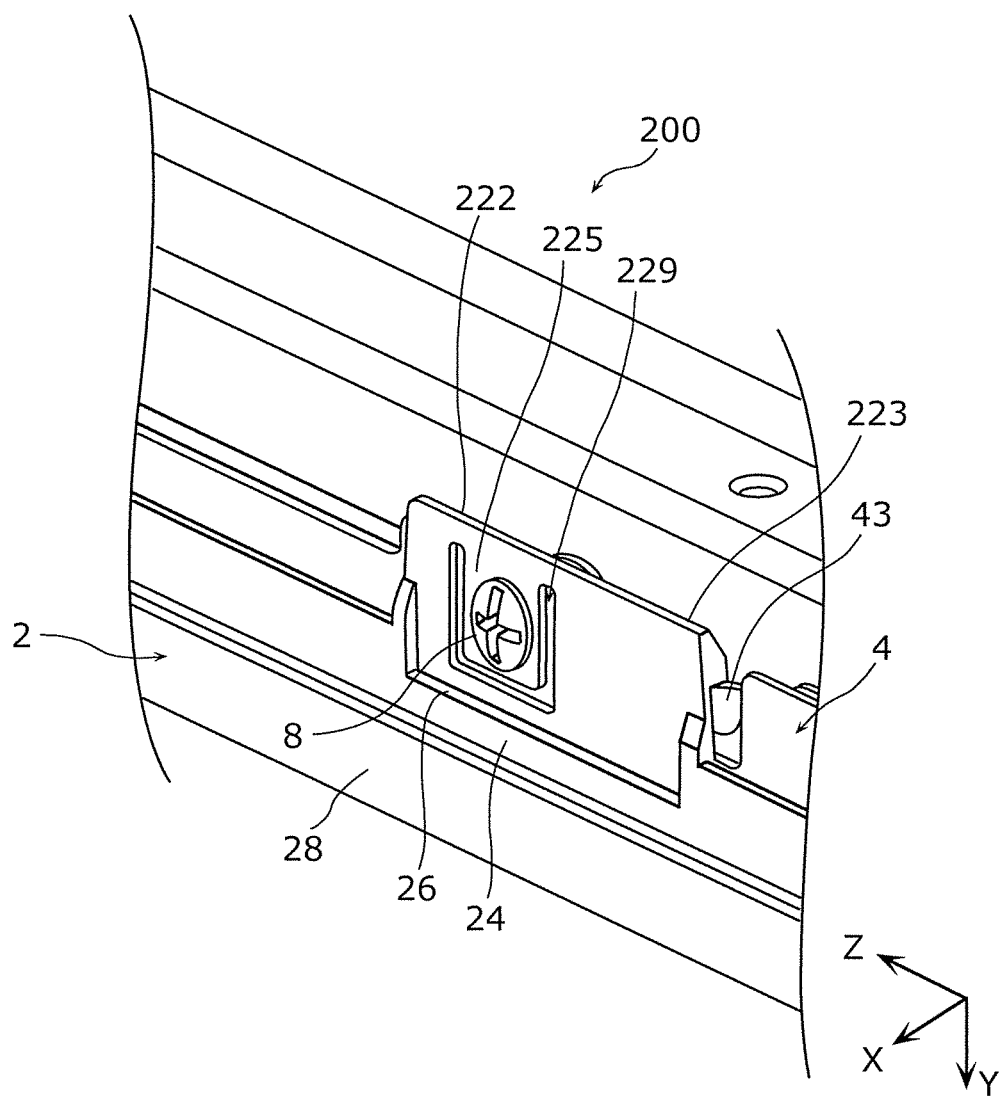
FIG. 10 is a perspective view illustrating an example of the structure of a front cabinet according to Variation 1 of Embodiment 1.

FIG. 10 is a perspective view illustrating an example of the structure of a front cabinet according to Variation 1 of Embodiment 1.

In a display apparatus 200 illustrated in FIG. 10, a tab 222, an engaging portion 223, a fixing portion 225, and a lightening portion 229 have different shapes from those in the display apparatus 100 illustrated in FIG. 4. The other structural elements in the display apparatus 200 are the same as the corresponding structural elements in the display apparatus 100, therefore being denoted by the same numerals, and descriptions thereof are omitted.

In the display apparatus 200, the lightening portion 229 is a slit provided on three sides of a rectangle surrounding the fixing portion 225 other than one side thereof located deep (close to the tip of the tab 222). The tab 222 and the engaging portion 223 are connected throughout the length from the base to the tip as one body. The fixing portion 225 is connected to the tab 222 by only the one side of the rectangle, therefore being easy to warp and deform by axial force of the fastener 8.

Thus, also in the display apparatus 200, the fixing portion 225 is easy to warp and deform, thereby producing the effect of relaxing the requirement of the dimensional accuracy for the front cabinet 2, as in the case of the display apparatus 100.

It should be noted that the lightening portion 29, 229 is not limited to the notch and the slit and may instead be one of a thin portion and holes. Even with such a structure, the lightening portion 29, 229 will be less rigid than the surrounding area so that the fixing portion 25 can be made easy to warp and deform by axial force of the fastener 8.

Figure 11:
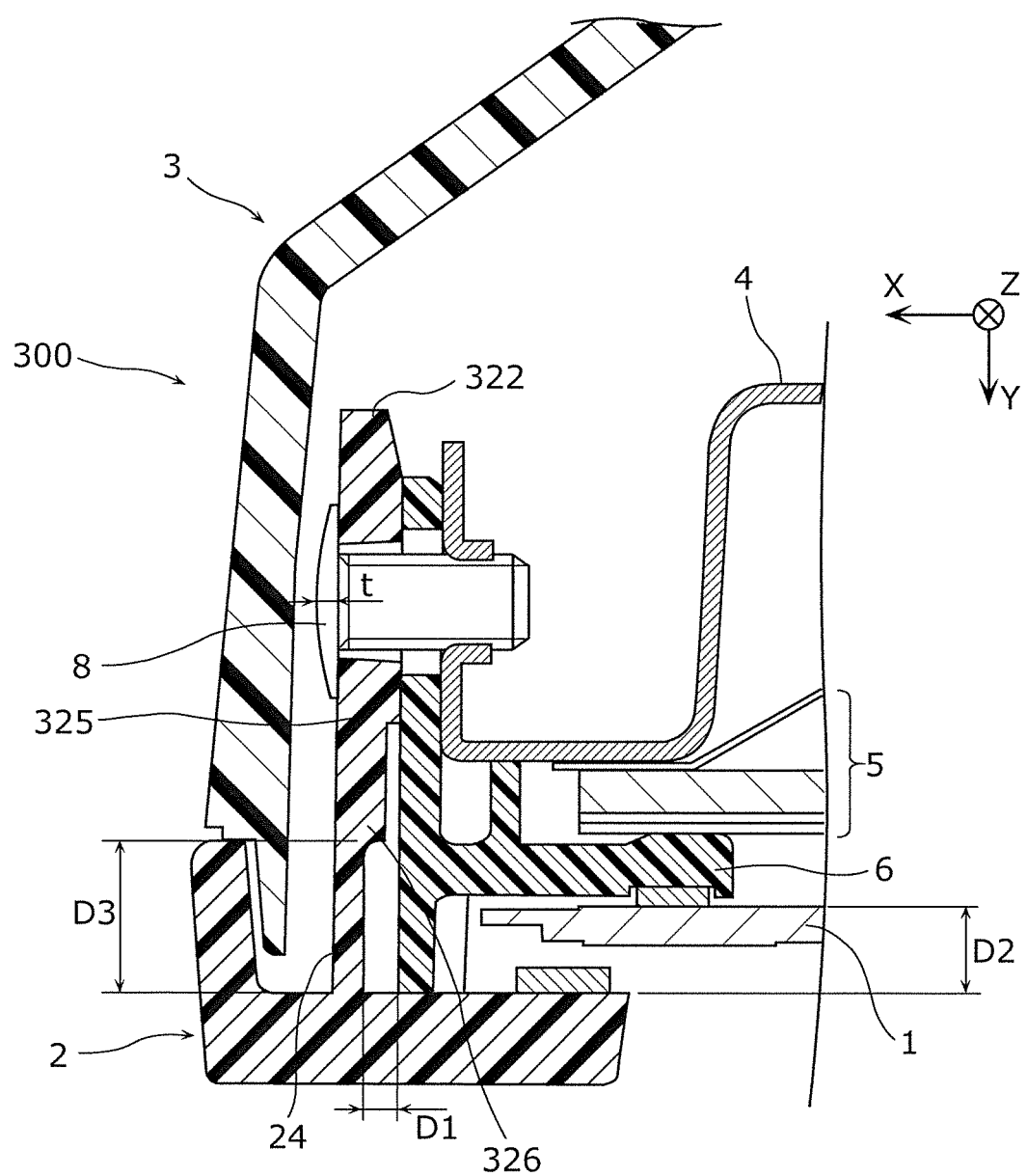
FIG. 11 is a cross-sectional view illustrating an example of the structure of a front cabinet according to Variation 2 of Embodiment 1.

FIG. 11 is a cross-sectional view illustrating an example of the structure of a front cabinet according to Variation 2 of Embodiment 1.

In a display apparatus 300 illustrated in FIG. 11, a tab 322 of a front cabinet 302 has a different shape from that in the display apparatus 100 illustrated in FIG. 5. The other structural elements in the display apparatus 300 are the same as the corresponding structural elements in the display apparatus 100, therefore being denoted by the same numerals, and descriptions thereof are omitted.

In the display apparatus 300, a connecting portion 326 of the tab 322 has a step on an inside surface only and no step on an outside surface. Specifically, the step of the connecting portion 326 on the inside surface is located deeper than the back surface of the frame portion 21 by the distance D3 as in the case of the connecting portion 26. The distance D3 is greater than the distance D2 which is the distance from the back surface of the frame portion 21 to the back surface of the display unit 1.

Thus, also in the display apparatus 300, providing space of the size defined by the width D1 and the depth D3 on the display unit 1 side of the base portion 24 produces the effect of a reduction in the likelihood of interference of the base portion 24 with the cell guide 6 as in the case of the display apparatus 100. In the display apparatus 300, however, the tab 322 has no step on the outside surface, leading to no reduction in the amount of protrusion for the thickness t of the head of the fastener 8 when the display apparatus 300 is viewed from the front.

Figure 12:
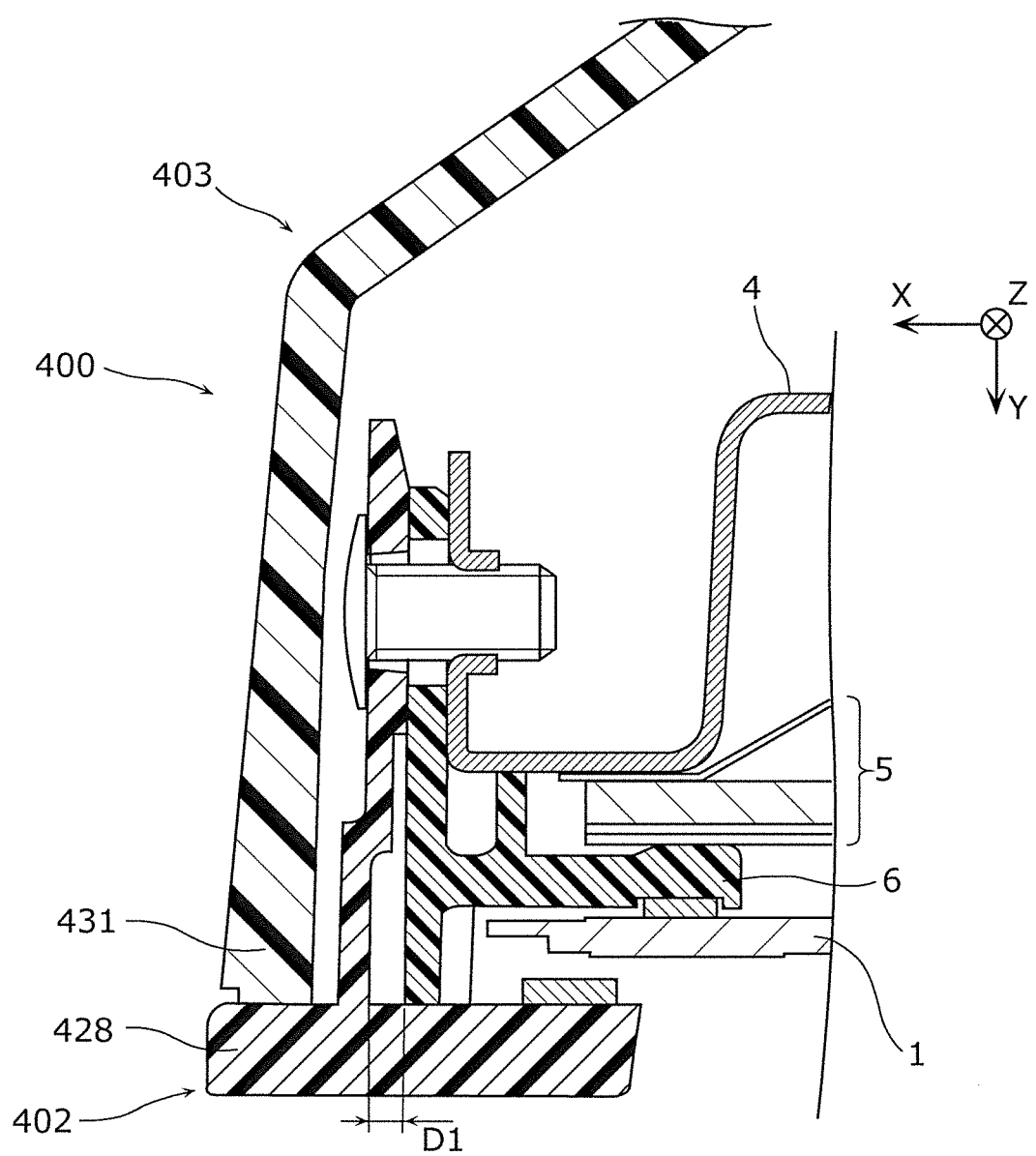
FIG. 12 is a cross-sectional view illustrating an example of the structures of a front cabinet and a rear cabinet according to Variation 3 of Embodiment 1.

FIG. 12 is a cross-sectional view illustrating an example of the structures of a front cabinet and a rear cabinet according to Variation 3 of Embodiment 1.

In a display apparatus 400 illustrated in FIG. 12, unlike the display apparatus 100 illustrated in FIG. 5, a contiguous portion 431 of a rear cabinet 403 is not inserted into a front cabinet 402, that is, the back surface of an outer periphery 428 of the front cabinet 402 and an end surface of the contiguous portion 431 of the rear cabinet 403 contact each other so that the rear cabinet 403 and the front cabinet 402 are contiguous. The other structural elements in the display apparatus 400 are the same as the corresponding structural elements in the display apparatus 100, therefore being denoted by the same numerals, and descriptions thereof are omitted.

Figure 13:
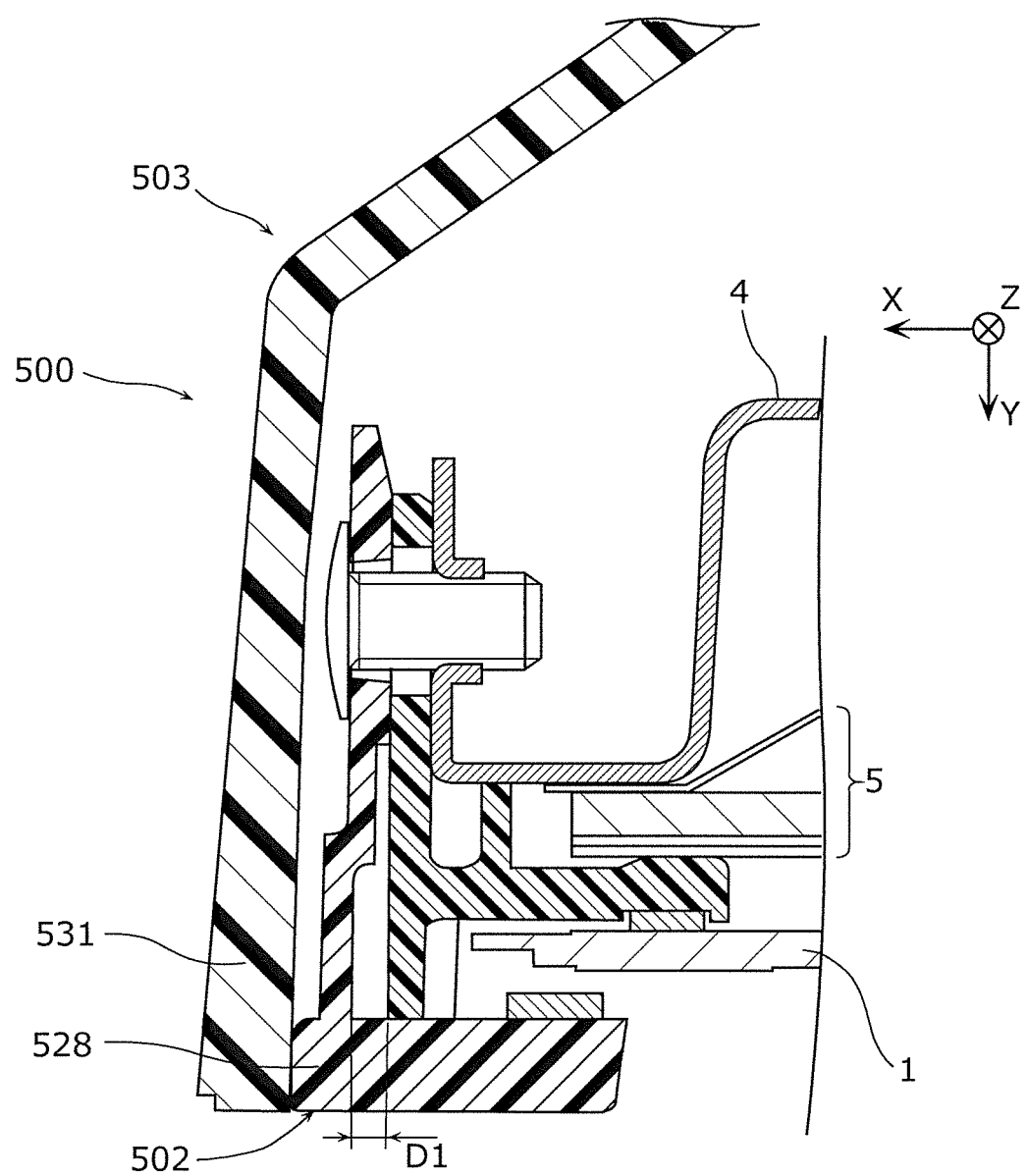
FIG. 13 is a cross-sectional view illustrating an example of the structures of a front cabinet and a rear cabinet according to Variation 4 of Embodiment 1.

FIG. 13 is a cross-sectional view illustrating an example of the structures of a front cabinet and a rear cabinet according to Variation 4 of Embodiment 1.

In a display apparatus 500 illustrated in FIG. 13, unlike the display apparatus 100 illustrated in FIG. 5, a contiguous portion 531 of a rear cabinet 503 is not inserted into a front cabinet 502, that is, an end surface of an outer periphery 528 of the front cabinet 502 and an inside surface of the contiguous portion 531 of the rear cabinet 503 contact each other so that the rear cabinet 503 and the front cabinet 502 are contiguous. The other structural elements in the display apparatus 500 are the same as the corresponding structural elements in the display apparatus 100, therefore being denoted by the same numerals, and descriptions thereof are omitted.

Since such variations represented by the display apparatuses 400 and 500 are not essential to the reduction in frame thickness, the display apparatuses 400 and 500 are also capable of reducing the frame thickness as is the display apparatus 100.

Figure 14:
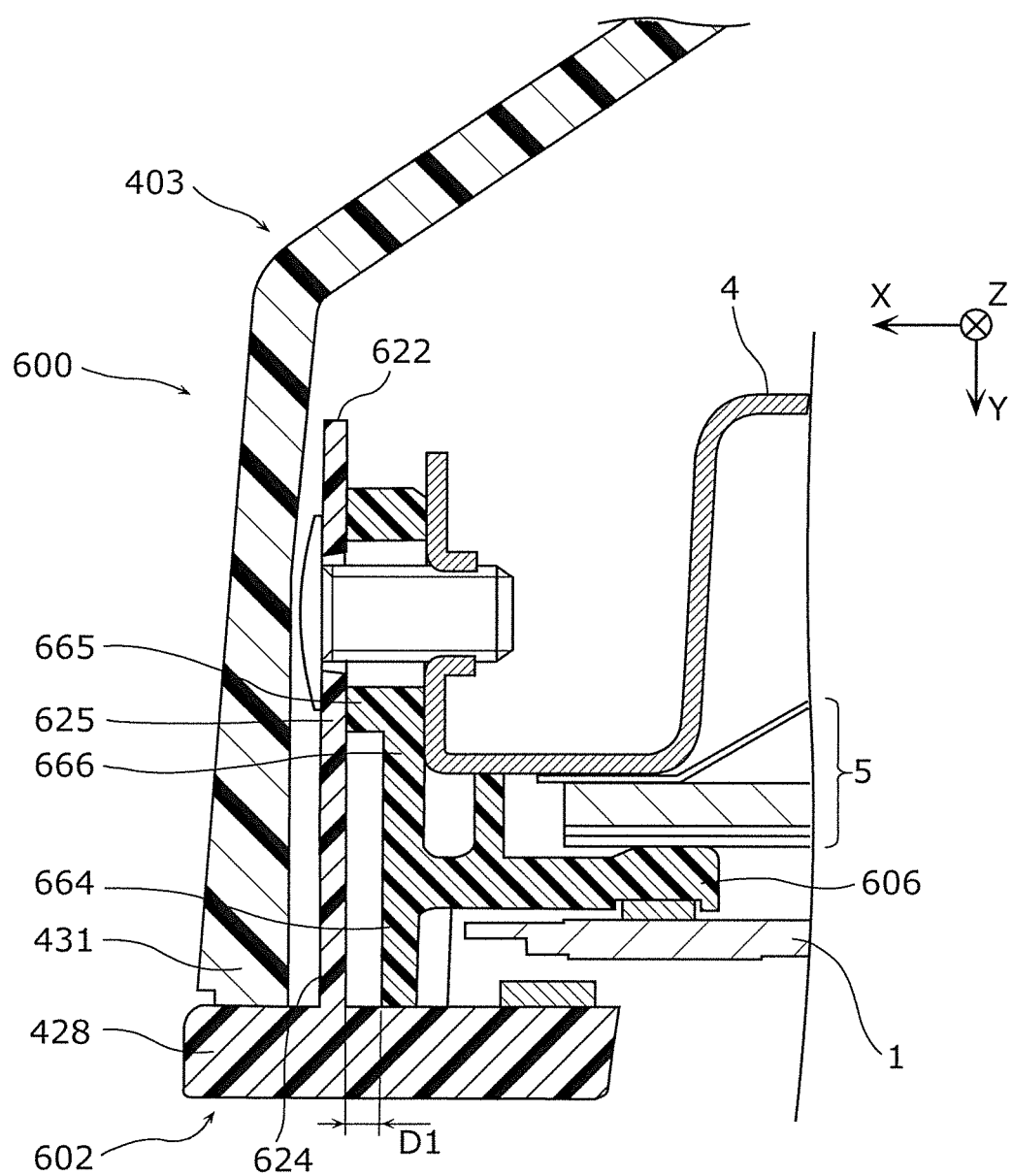
FIG. 14 is a cross-sectional view illustrating an example of the structures of a front cabinet and a cell guide according to Variation 5 of Embodiment 1.

FIG. 14 is a cross-sectional view illustrating an example of the structures of a front cabinet and a cell guide according to Variation 5 of Embodiment 1.

In a display apparatus 600 illustrated in FIG. 14, a tab 622 and a cell guide 606 of a front cabinet 602 have different shapes from those in the display apparatus 400 illustrated in FIG. 12. The other structural elements in the display apparatus 600 are the same as the corresponding structural elements in the display apparatus 400, therefore being denoted by the same numerals, and descriptions thereof are omitted.

The display apparatus 600 is different in that the tab 622 of the front cabinet 602 has a shape with no step or curve as a result of a base portion 624 and a fixing portion 625 being linearly connected.

The cell guide 606 is provided with a base portion 664 which extends in the depth direction from around the back surface of the front cabinet 602, a fixing portion 665 which is fastened together with the fixing portion 625 of the tab 622, and a connecting portion 666 which connects the base portion 664 and the fixing portion 655 by a step.

Specifically, with the step of the connecting portion 666, an outside surface of the fixing portion 665 of the cell guide 606 is located outside relative to an outside surface of the base portion 664 by the distance D1. The step of the connecting portion 666 of the cell guide 606 provides space of the size defined by the width D1 on the opposite side of the base portion 664 from the display unit 1.

With the space provided on the opposite side of the base portion 664 from the display unit 1, the base portion 624 and the cell guide 606 are less likely to interfere with each other. As a result, deterioration of image quality such as variations in displayed images due to the display unit 1 being pressed by the base portion 624 via the cell guide 606 is prevented, for example.

Thus, it is possible to make various modifications to the display apparatus 100. Other than the above-described modifications, the following modifications, although not illustrated, may be made, For example, in the case where the display apparatus 100 includes an inner frame other than the rear frame 4, the front cabinet 2 and the inner frame may be fixed together in a direction crossing the depth direction.

Furthermore, for example, the fixing portion 25 may be disposed at substantially the same position as the display unit 1 in the depth direction.

Furthermore, for example, the tab 22 may be inclined inward with respect to the depth direction throughout the length from the base portion 24 to the fixing portion 25.

Furthermore, for example, the tabs 22 and the engaging portions 23, which are provided along the outer periphery of the display apparatus 100, may be different in number. For example, it may be possible that for each set of a predetermined number of two or more tabs 22, one engaging portion 23 is provided or no engaging portion 23 is provided.

With such modified display apparatuses, it is also possible to reduce the frame thickness by fixing the front cabinet 2 and the rear frame 4 together in a direction crossing the depth direction as in the case of the display apparatus 100.

(Embodiment 2)

A display apparatus according to Embodiment 2 has a structure in which the front cabinet and the rear frame are fixed together in a direction crossing the depth direction as in the case of the display apparatus according to Embodiment 1 and furthermore, at least a part of the rear frame is exposed as an exterior of the display apparatus. The display apparatus according to Embodiment 2 is described in detail below.

Figure 15:
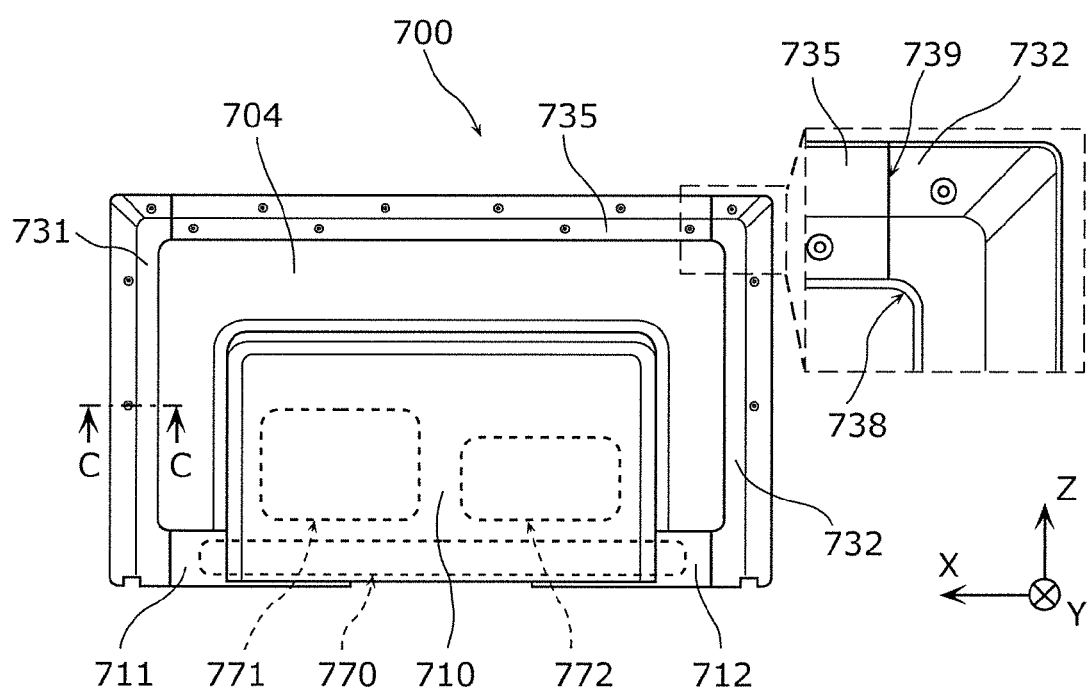
FIG. 15 is a rear view illustrating an example of the structure of a display apparatus according to Embodiment 2.

FIG. 15 is a rear view illustrating an example of the structure of the display apparatus according to Embodiment 2 along with an enlarged partial view of the back surface of the display apparatus. In FIG. 15, a display apparatus 700 is structured as with the display apparatus 100 illustrated in FIG. 2 and furthermore, an example of arrangement and shapes of circuit boards 770, 771, and 772 and rear cabinets 710, 711, 712, 731, 732, and 735 is explicitly illustrated.

As illustrated in FIG. 15, in the display apparatus 700, a rear frame 704 covers the whole back surface of the display apparatus 700 and is at least partially exposed as an exterior of the display apparatus 700. The rear frame 704 may be made from a metal or resin, for example.

The circuit boards 770, 771, and 772 are, for example, boards on which various circuits such as a power circuit, a tuner circuit, and a decoder circuit are mounted, and are installed outside the rear frame 704.

A rear cabinet of the display apparatus 700 is made up of cabinet sections, i.e., the rear cabinets 710, 711, 712, 731, 732, and 735.

The rear cabinet 710 covers, in a central portion of the display apparatus 700, a central portion of the circuit board 770 and the circuit boards 771 and 772. The rear cabinets 711 and 712 each cover an end part of the circuit board 700 in a lower end part of the display apparatus 700. The rear cabinets 710, 711, and 712 may be made from resin or a metal, for example.

The rear cabinets 731, 732, and 735 cover, from the back, fixing points of the front cabinet 2 and the rear frame 704 on the upper side and both lateral sides of the display apparatus 700. At each of the fixing points, the fixing portion 25 of the front cabinet 2 is included. The rear cabinets 731, 732, and 735 may be made from resin or a metal, for example.

The enlarged part illustrated in FIG. 15 will be described later.

Figure 16:
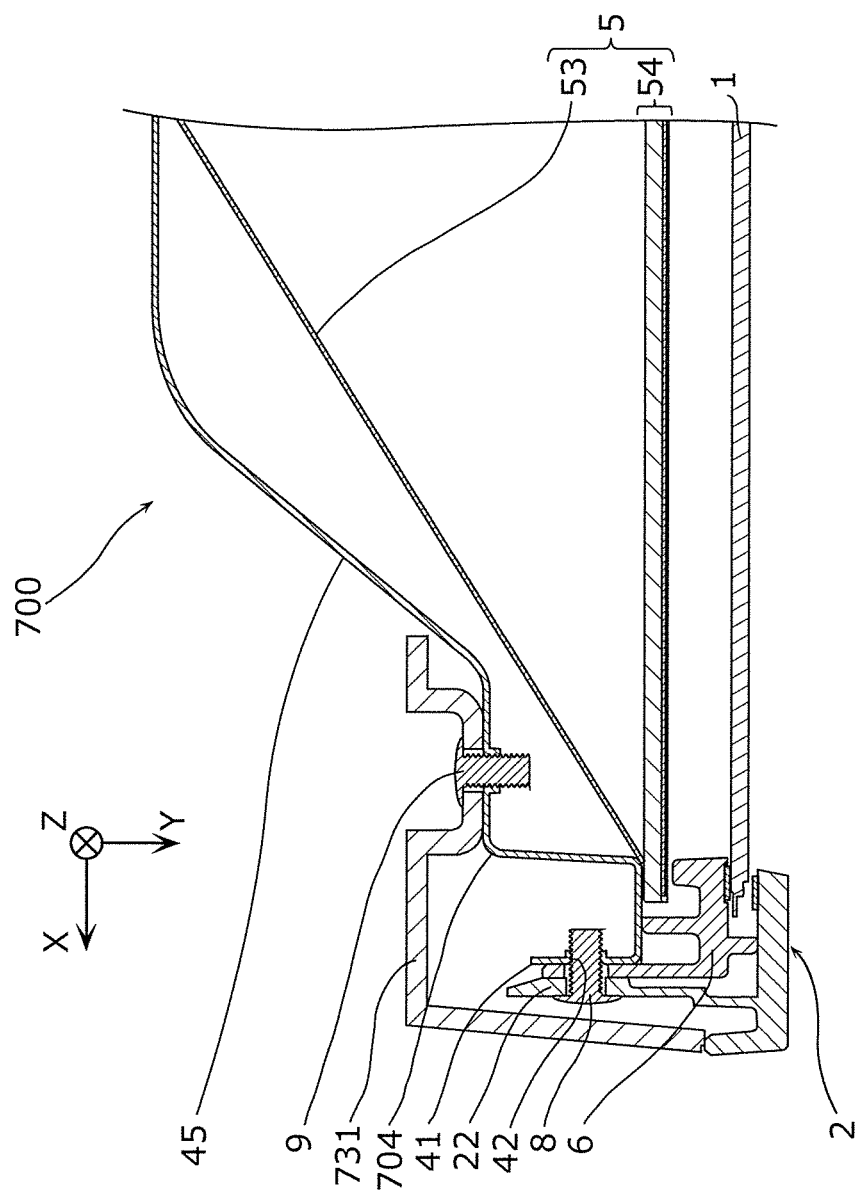
FIG. 16 is a cross-sectional view illustrating an example of the structures of a front cabinet, a rear frame, and a rear cabinet according to Embodiment 2.

FIG. 16 is a cross-sectional view illustrating an example of the structures of the front cabinet 2, the rear frame 704, and a rear cabinet 731 in the display apparatus 700, taken along line C-C of FIG. 15. The structure for fixing the front cabinet 2 and the rear frame 704 in FIG. 16 is the same as the structure for fixing the front cabinet 2 and the rear frame 4 in the display apparatus 100 illustrated in FIG. 5, and as such, a description thereof is omitted and the following describes matters that have not been described with reference to FIG. 5. As illustrated in FIG. 16, the outer periphery 41 of the rear frame 704 has the fixing hole 42. A central portion 45 which is a portion of the rear frame 704 other than the outer periphery 41 has a concave shape narrowing backward and provides space for the light source unit 5 to be placed. The rear cabinet 731 is fixed to the rear frame 704 with fasteners 9 in the depth direction.

In the case of processing thin sheet metal into the rear frame 704, it may be possible, for example, to form the central portion 45 by drawing and form the outer periphery 41 by bending. The fixing hole 42 may be formed by burring and thread cutting.

Although the fastener 8 and the fastener 9 are in the same cross-section in FIG. 16 for the purpose of illustration, the fastener 8 and the fastener 9 may be in different cross-sections.

The outer periphery of the display apparatus 700 has mutually separated fixing points having the same structure as the fixing point illustrated in FIG. 16 as in the case of the display apparatus 100. With this, the rear cabinets 732 and 735 are fixed to the rear frame 704 with the fasteners 9 and cover the fixing points of the front cabinet 2 and the rear frame 704 as with the rear cabinet 731.

The display apparatus 700 structured as above achieves the reduction in frame thickness, which is a main effect, as a result of the front cabinet 2 and the rear frame 704 being fixed together in a direction crossing the depth direction. Furthermore, intentional exposure of the rear frame 704 on the exterior of the display apparatus 700 allows the rear cabinets 710, 711, 712, 731, 732, and 735 to be small, leading to a reduction in material cost.

It should be noted that the above effect can be obtained even when the rear cabinet is a single rear cabinet. The rear cabinet that is made up of a plurality of rear cabinets produces the following additional effects.

First, each of the rear cabinets is small; therefore, the molding cost is reduced.

Furthermore, the use of a suitable material for each of the rear cabinets can be an attempt to optimize the cost of such elements. For example, it may be that the rear cabinets 710, 711, and 712 covering the circuit boards 770, 771, and 772 are made from costly flame-retardant resin while the rear cabinets 731, 732, and 735 covering the fixing points of the front cabinet 2 and the rear frame 704 are made from low-cost, not highly flame-retardant resin.

Furthermore, dimensional variations in the rear cabinets can be absorbed at separating points of the rear cabinets. For example, as illustrated in the enlarged part of FIG. 15, the rear cabinet 735 and the rear cabinet 732 may be separated along a separation line 739 passing through the end point of a curve 738 inside the rear cabinet 732. Through such separation, dimensional variations in the rear cabinet 735 in the width direction (the X axis direction) can be absorbed at the position of separation line 739, for example.

It should be noted that in the case where the rear cabinet is made up of the cabinet sections, the specific number and positions of separating points at which the rear cabinets are separated are not particularly limited. Several examples of how to separate the rear cabinets are described below.

Figure 17:
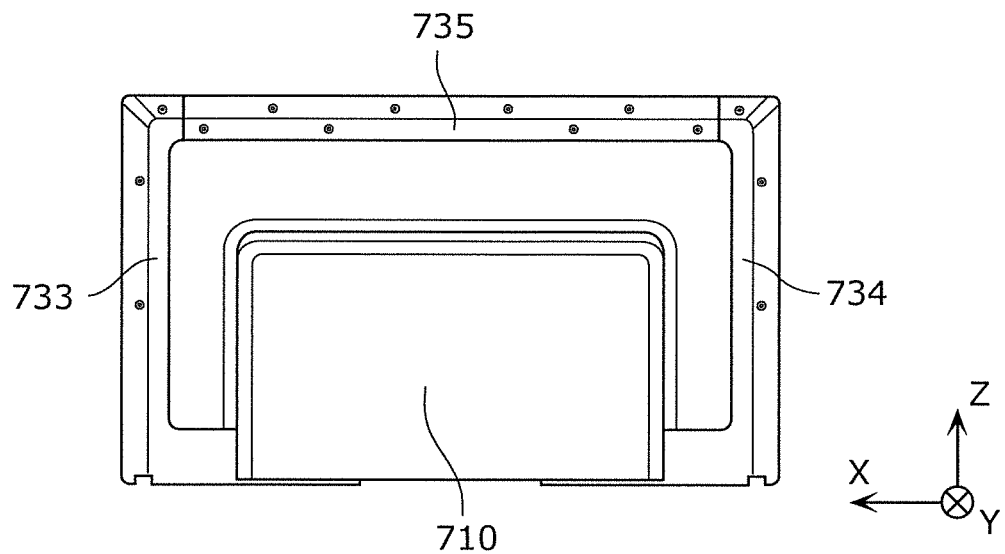
FIG. 17 is a rear view illustrating an example of separated rear cabinets according to Embodiment 2.

FIG. 17 is a rear view illustrating another example of the separated rear cabinets. For example, it may be that as illustrated in FIG. 17, the rear cabinets 711 and 731 separated in FIG. 15 are replaced by a single rear cabinet 733, and the rear cabinets 712 and 732 separated in FIG. 15 are replaced by a single rear cabinet 734.

Figure 18:
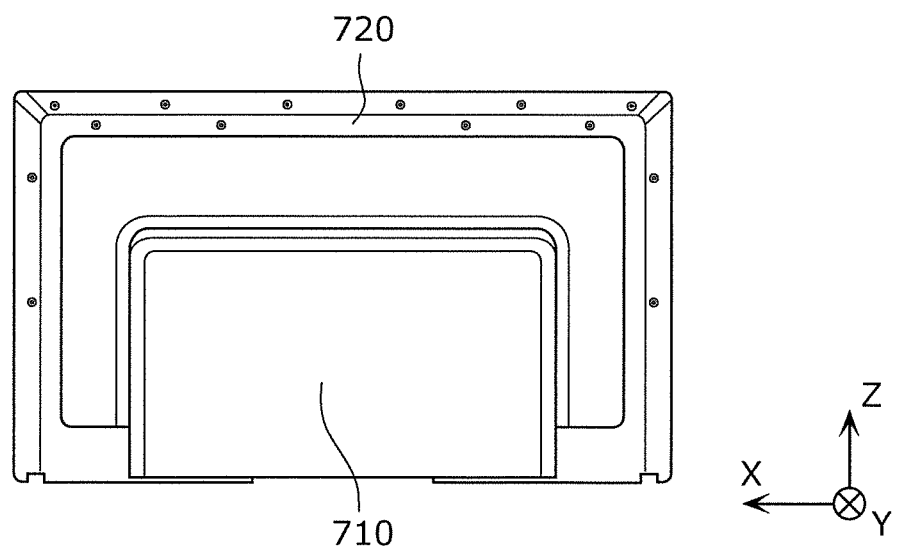
FIG. 18 is a rear view illustrating an example of separated rear cabinets according to Embodiment 2.

FIG. 18 is a rear view illustrating another example of the separated rear cabinets. For example, as illustrated in FIG. 18, the rear cabinets 711, 712, 731, 732, and 735 separated in FIG. 15 may be replaced by a single rear cabinet 720.

These separation examples are suitable, for example, in the case where parts corresponding to the rear cabinets 711 and 712 in FIG. 15 do not need to have improved flame retardant properties because all the circuit boards are covered by the rear cabinet 710.

(Variation of Embodiment 2)

A display apparatus according to Variation of Embodiment 2 is described.

Figure 19:
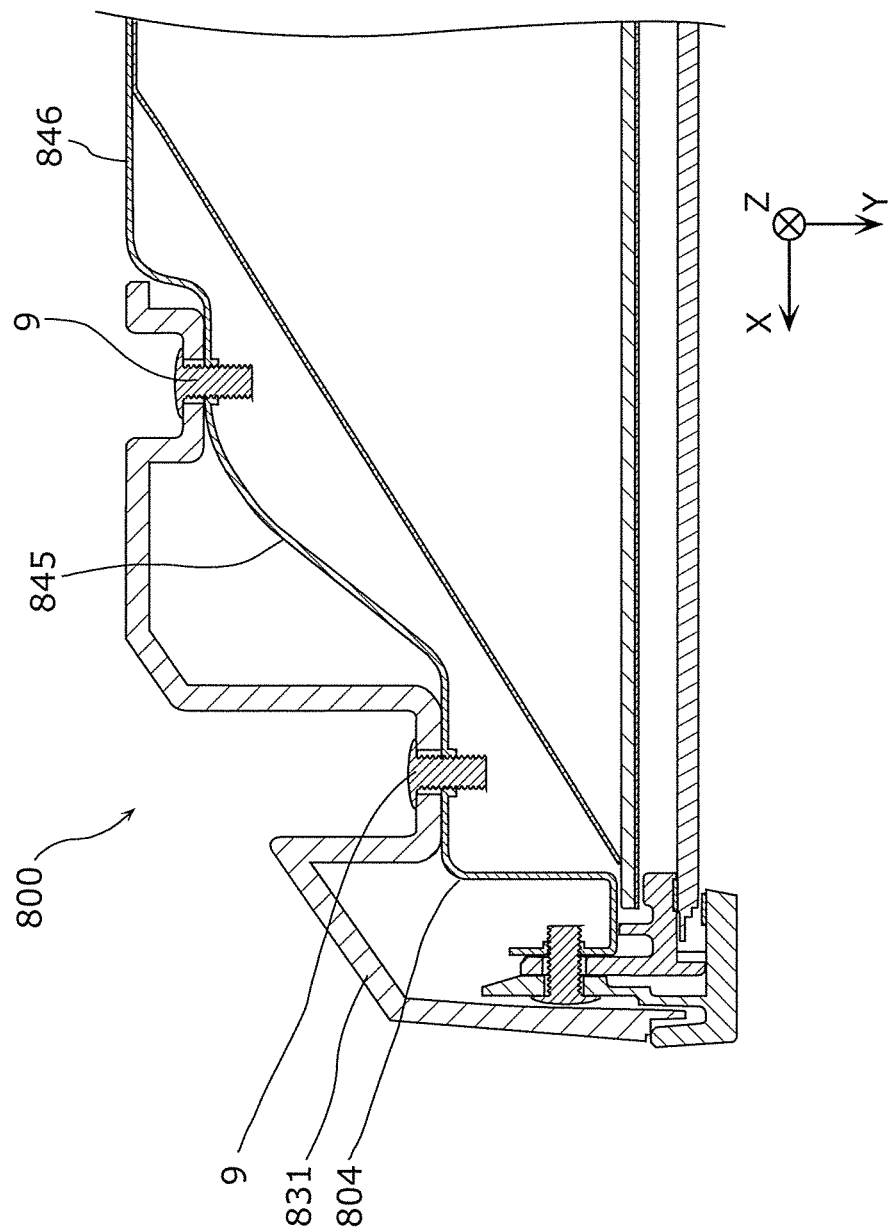
FIG. 19 is a cross-sectional view illustrating an example of the structures of a front cabinet, a rear frame, and a rear cabinet according to Variation of Embodiment 2.

FIG. 19 is a cross-sectional view illustrating an example of the structures of a rear frame 804 and a rear cabinet 831 in a display apparatus 800 according to Variation of Embodiment 2. The display apparatus 800 is configured by replacing the rear frame 704 and the rear cabinet 731 in the display apparatus 700 illustrated in FIG. 16 with the rear frame 804 and the rear cabinet 831, respectively.

The rear frame 804 includes a central portion 845 formed by two-stage drawing. The rear cabinet 831 has a depth reaching a bottom surface 846 of the rear frame 804 and is fixed to two stages of the central portion 845 of the rear frame 804 with the fasteners 9. The bottom surface 846 of the rear frame 804 is exposed as an exterior of the display apparatus 800.

Figure 20:
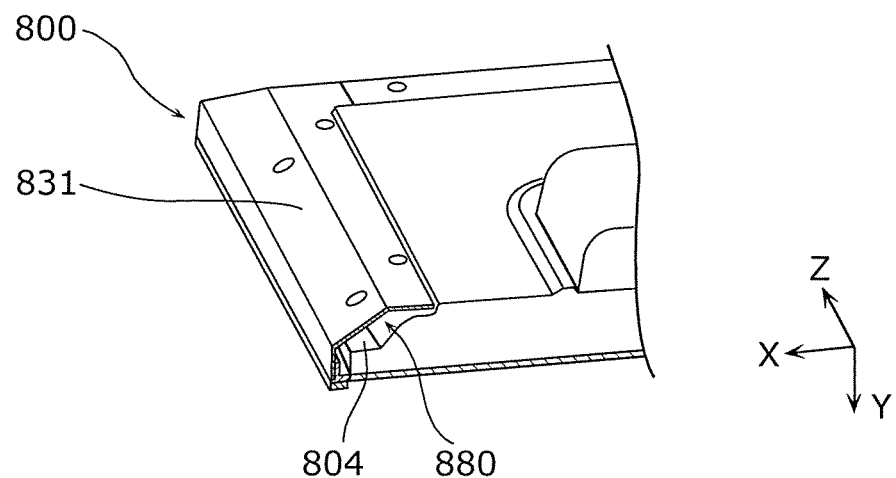
FIG. 20 is a cross-sectional perspective view illustrating an example of the structure of a display apparatus according to Variation of Embodiment 2.

FIG. 20 is a cross-sectional perspective view illustrating an example of the structure of the display apparatus 800. In the display apparatus 800, the rear cabinet 831 and the rear frame 804 provide larger space 880 than in the display apparatus 700. The space 880 provided by the rear frame 804 which is given increased rigidity by two-stage drawing is suitable for placing a component.

Figure 21:
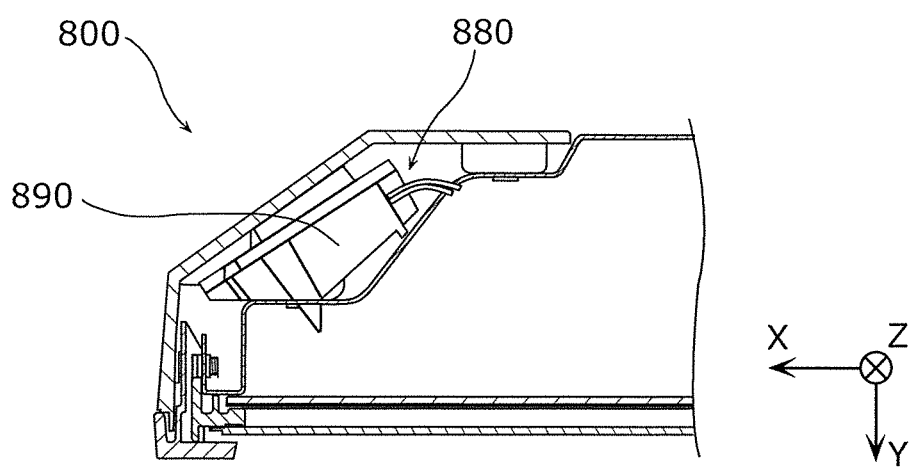
FIG. 21 is a cross-sectional view illustrating an example of the structure of a display apparatus according to Variation of Embodiment 2.

FIG. 21 is a cross-sectional view illustrating an example of the component placed in the space 880. In FIG. 21, a switch box 890 is placed in the space 880.

Thus, the display apparatus 800 includes the rear frame 804 formed by two-stage drawing and the rear cabinet 831 having a large depth, and therefore, as compared to the display apparatus 700, has a disadvantage in cost of elements, but is superior in that the display apparatus 800 has increased rigidity and that the space 880 in which a component can be placed is obtained.

(Embodiment 3)

A display apparatus according to Embodiment 3 has a structure in which the front cabinet and the rear frame are fixed together in a direction crossing the depth direction as in the case of the display apparatus according to Embodiment 1, and further includes an edge-lit light source unit. The display apparatus according to Embodiment 3 is described in detail below.

Figure 22:
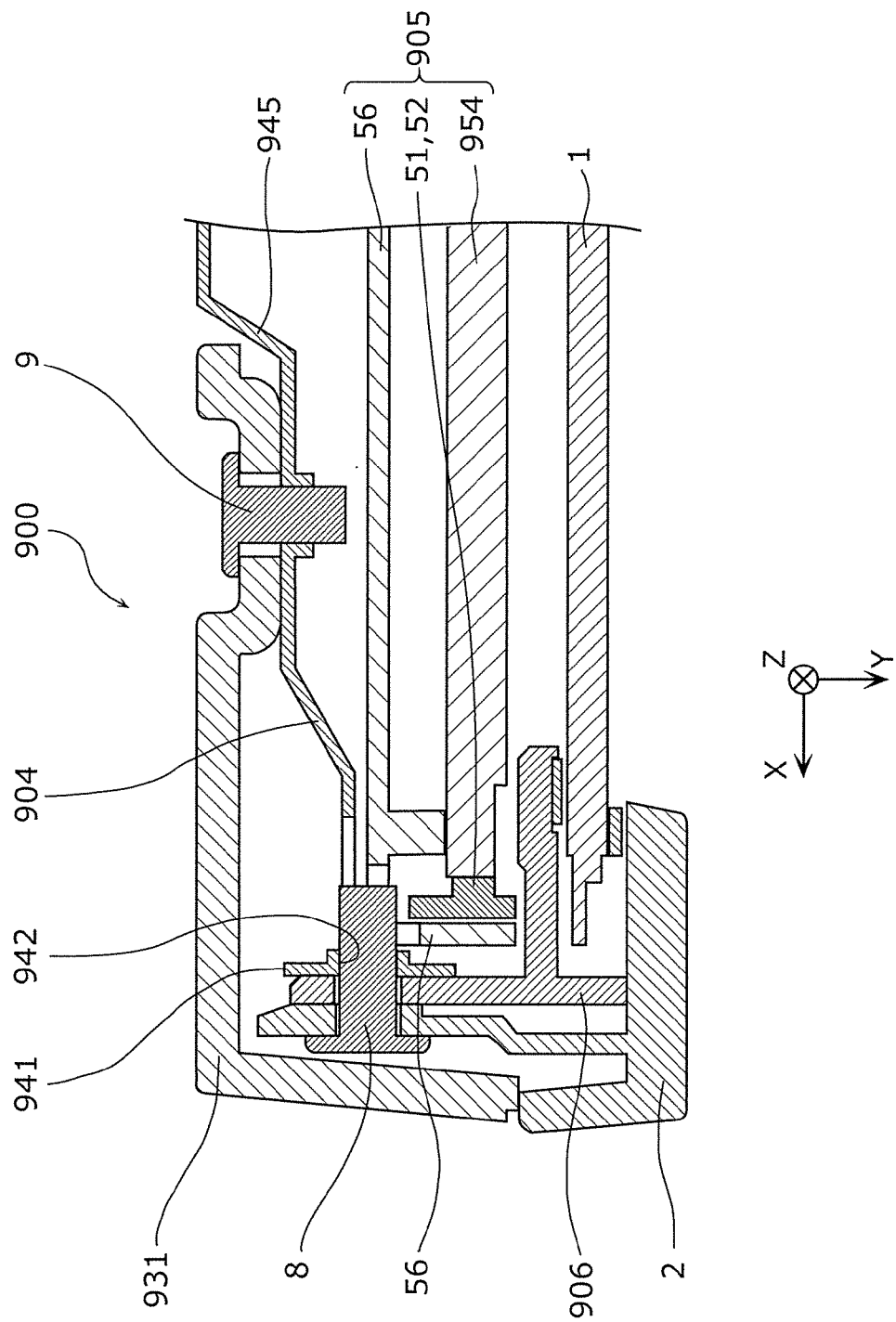
FIG. 22 is a cross-sectional view illustrating an example of the structure of a display apparatus according to Embodiment 3.

FIG. 22 is a cross-sectional view illustrating an example of the structure of a display apparatus according to Embodiment 3.

As illustrated in FIG. 22, a display apparatus 900 is configured by replacing the power source unit 5, the rear frame 704, and the rear cabinet 731 in the display apparatus 700 illustrated in FIG. 16 with a light source unit 905, a rear frame 904, and a rear cabinet 931, respectively.

In the display apparatus 900, the light source unit 905 includes the light source 52 attached to the holder 51, an optical sheet 954, and a heat sink 56.

The light source 52 is, for example, made from a light-emitting material such as a LED or a cold-cathode tube, and emits light to an end surface of the optical sheet 954. The optical sheet 954 is, for example, a functional sheet such as a light guide plate, a reflective plate, and a reflective sheet, in which light from the light source 52 enters an end surface and travels toward the back surface of the display unit 1 with intensity that is substantially uniform therein. The heat sink 56 is, for example, made from thin sheet metal, and transfers and dissipates heat generated by the light source 52.

The rear cabinet 931 is fixed to the rear frame 904 with the fasteners 9 and covers fixing points of the front cabinet 2 and the rear frame 4 with the fasteners 8, and the light source 52, The rear frame 904 is produced by processing thin sheet metal; a central portion 945 of the rear frame 904 has a concave shape narrowing backward, and an outer periphery 941 of the rear frame 904 stands in the depth direction and has a fixing hole 942 through which the fastener 8 passes.

The method of processing the rear frame 904 is not particularly limited; for example, it may be possible to form the central portion 945 by drawing and form the outer periphery 941 by bending. The fixing hole 942 may be formed by burring and thread cutting.

Although the fastener 8 and the fastener 9 are in the same cross-section in FIG. 22 for the purpose of illustration, the fastener 8 and the fastener 9 may be in different cross-sections.

In the display apparatus 900, light sources 952 are disposed on one to four of the four sides of the outer periphery according to a size of the display unit 1. The outer periphery of the display apparatus 900 has mutually separated fixing points having the same structure as the fixing point illustrated in FIG. 22 as in the case of the display apparatus 100.

In the display apparatus 900, covering the fixing points of the front cabinet 2 and the rear frame 904 by the rear cabinet 931 allows not only to achieve favorable design and safety, but also to prevent a user from directly touching the light source 52 which generates heat.

The maximum allowable temperature of a resin component for a user to touch is higher than that of a metal component. Accordingly, making the rear cabinet 931 from resin and covering the light source 52 by the rear cabinet 931 increases the maximum allowable temperature, being helpful in simplifying the design for heat dissipation, Furthermore, in the case where the rear cabinet is made up of a plurality of rear cabinets, an attempt to optimize the cost of such elements is possible by using more costly flame-retardant resin for the rear cabinet 931 which covers the light source 52 than that for the other rear cabinets.

(Embodiment 4)

A display apparatus according to Embodiment 4 has a structure in which the front cabinet and the rear frame are fixed together in a direction crossing the depth direction as in the case of the display apparatus according to Embodiment 1 and furthermore, is configured such that the front cabinet and the rear cabinet are intended to interfere with each other. The display apparatus according to Embodiment 4 is described in detail below.

The display apparatus in which the front cabinet and the rear frame are fixed together in a direction crossing the depth direction achieves reduction in frame thickness, but as compared to the display apparatus in which the front cabinet and the rear frame are fixed together in the depth direction, has the following disadvantages. That is, the axial force of the fastener that fixes the front cabinet to the rear frame does not act in a direction in which the front cabinet is drawn deeper. Therefore, excessive separation or uneven separation (resulting from wavy deformation of the front cabinet) between the front cabinet (the inner periphery in particular) and the display unit is likely. Such excessive and uneven separation of the front cabinet lowers the appearance quality of the display apparatus and could further cause a failure to appropriately hold the display unit.

Thus, in the fourth embodiment, a display apparatus is proposed which has a structure for reducing or resolving the excessive and uneven separation of the front cabinet by intentional interference between the front cabinet and the rear cabinet.

Figure 23:
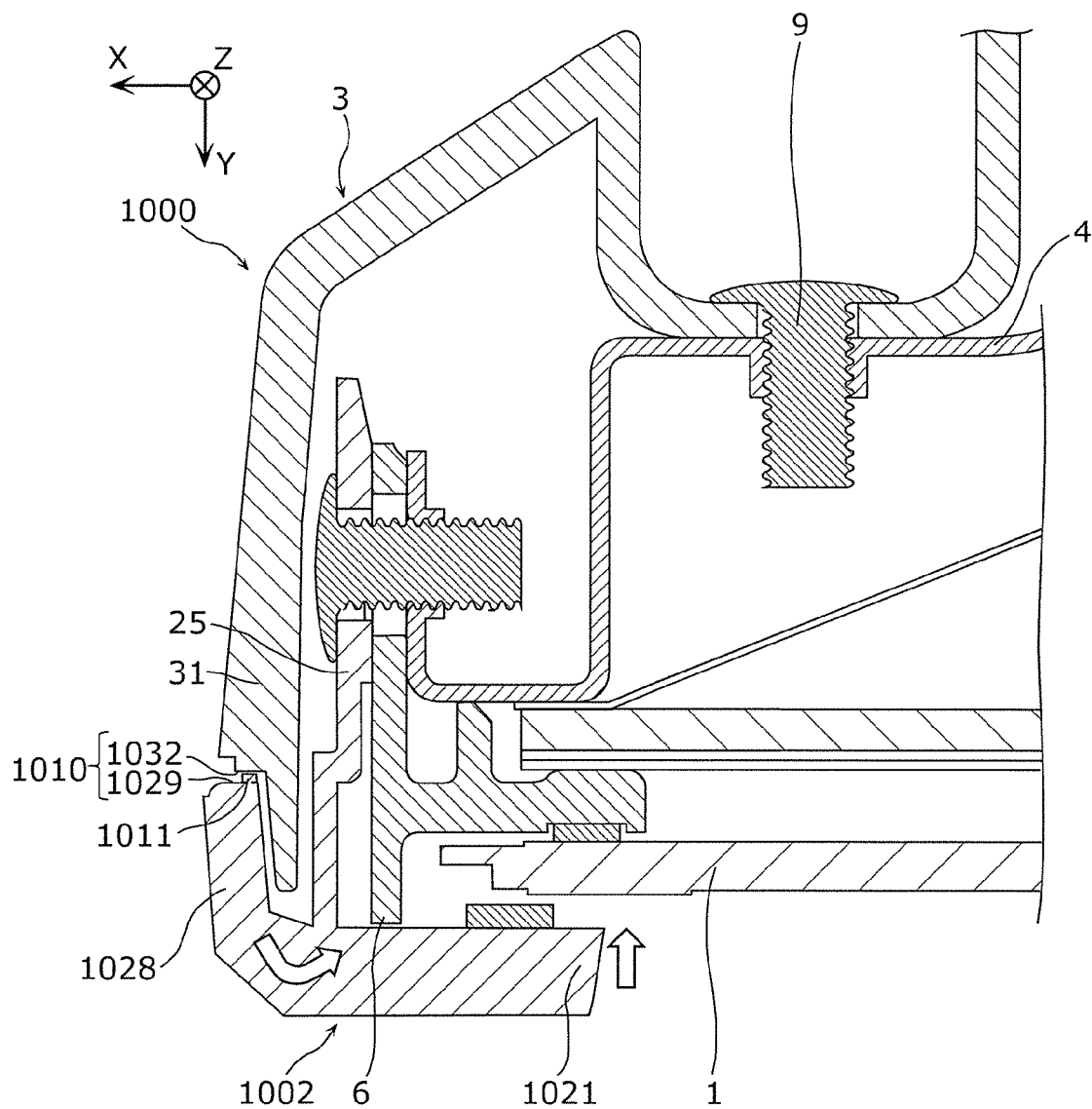
FIG. 23 is a cross-sectional view illustrating an example of the structures of a front cabinet, a rear frame, and a rear cabinet according to Embodiment 4.

FIG. 23 is a cross-sectional view illustrating an example of the structures of a front cabinet, a rear frame, and a rear cabinet in a display apparatus according to Embodiment 4.

Figure 24:
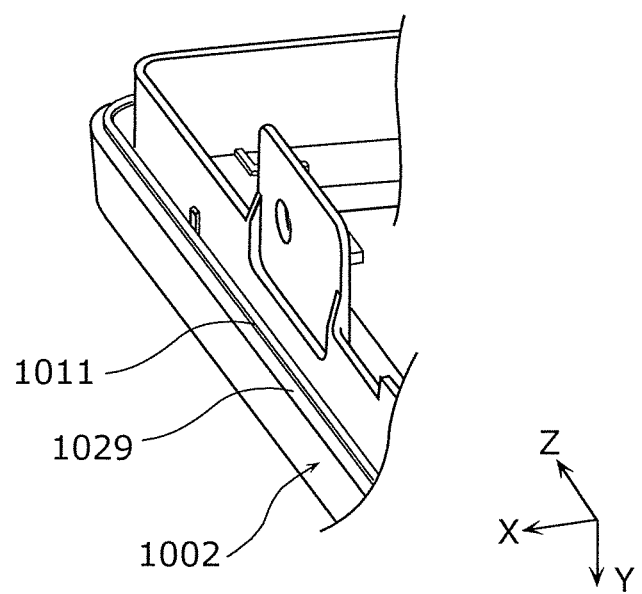
FIG. 24 is a perspective view illustrating an example of the structure of an interference portion according to Embodiment 4.

FIG. 24 is a perspective view illustrating an example of the structure of an interference portion.

Figure 25:
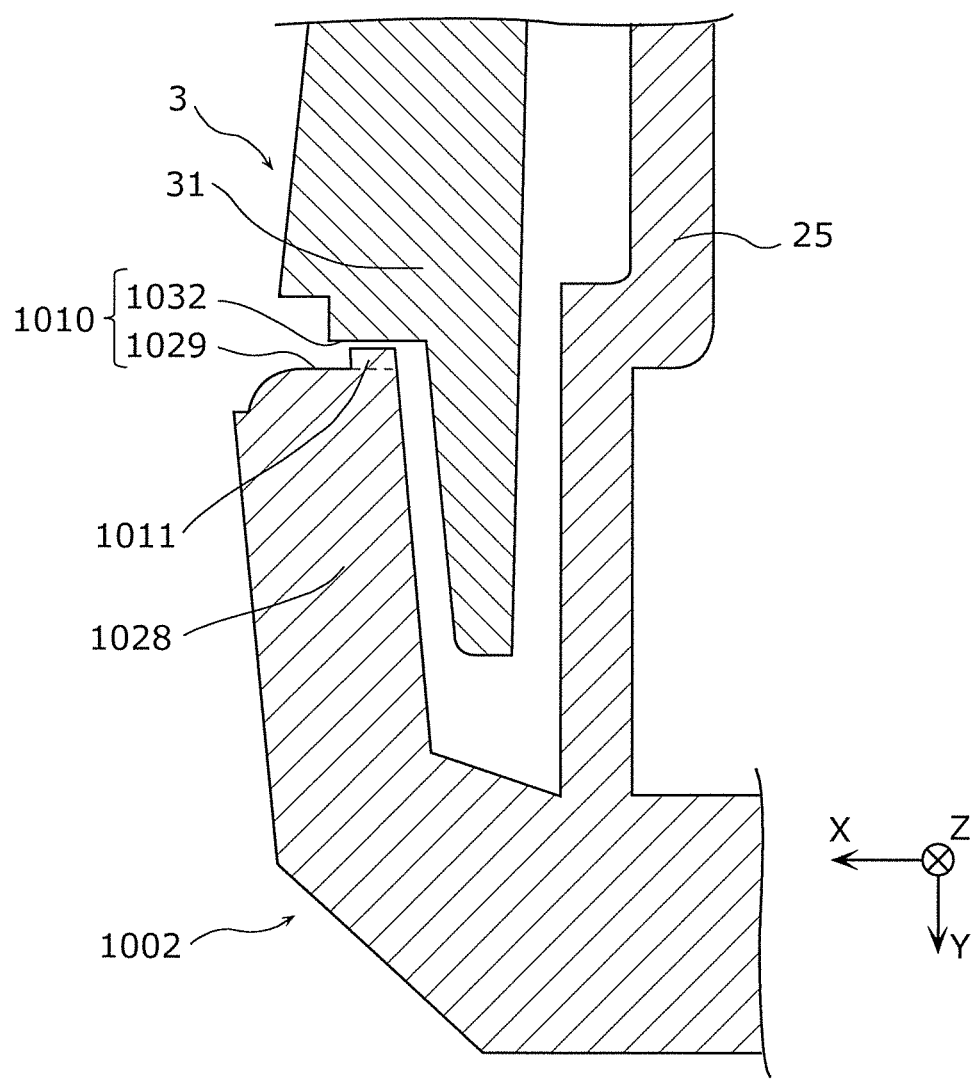
FIG. 25 is a cross-sectional view illustrating an example of the structure of an interference portion according to Embodiment 4.

FIG. 25 is a cross-sectional view illustrating an example of the structure of an interference portion.

In a display apparatus 1000 illustrated in FIG. 23 to FIG. 25, a front cabinet 1002 is different from that in the display apparatus 100 illustrated in FIG. 5. The other structural elements in the display apparatus 1000 are the same as the corresponding structural elements in the display apparatus 100, therefore being denoted by the same numerals, and descriptions thereof are omitted. In FIG. 23, the fastener 9 which fixes the rear cabinet 3 and the rear frame 4 together is explicitly illustrated, and in FIG. 24, the illustration of the lightening portion 29 is omitted.

An outer periphery 1028 of the front cabinet 1002 and the contiguous portion 31 of the rear cabinet 3 include a pair of facing portions 1010 which face each other in the depth direction. The facing portions 1010 include, for example, an end surface 1029 of the outer periphery 1028 of the front cabinet 1002 and a stepped surface 1032 provided on the contiguous portion 31 of the rear cabinet 3. The stepped surface 1032 is provided forward at a retreated position deeper than the tip of the contiguous portion 31. The end surface 1029 and the stepped surface 1032 may be at positions such that they do not interact without an interference portion 1011 (for example, at positions such that they just touch or are slightly away in the depth direction). The facing portions 1010 may extend in the form of a ring that surrounds the display unit 1, on the outer periphery of the display apparatus 1000.

At least one of the facing portions 1010 includes the interference portion 1011 which interferes with the other of the facing portions 1010 in the depth direction when the front cabinet 1002 is fixed to the rear frame 4 and the rear cabinet 3 is fixed to the rear frame 4.

Specific position and shape of the interference portion 1011 are not particularly limited; for example, the interference portion 1011 may be a protrusion having a rectangular cross-section that is provided in the front cabinet 1002 and protrudes in the order of 0.2 to 0.3 mm in the depth direction from the end surface 1029 of the outer periphery 1028 of the front cabinet 1002. A height of the interference portion 1011 is defined by a distance in the depth direction from the end surface 1029 of the outer periphery 1028 to the tip of the interference portion 1011. The interference portion 1011 may be provided over a part of the width of the end surface 1029 of the outer periphery 1028 or over the entire width of the end surface 1029 of the outer periphery 1028. It may also be that a single interference portion 1011 is provided without interruptions, or a plurality of interference portions are provided at intervals over the entire circumference of the outer periphery 1028 of the front cabinet 1002. The interference portion 1011 may be formed integrally with the front cabinet 1002, or may alternatively be a separate component from the front cabinet 1002 which is attached to the front cabinet 1002.

When the inner periphery 1021 of the front cabinet 1002 reaches a position at a predetermined distance from the display unit 1 due to interference in the facing portions 1010, the cell guide 6 comes into contact with the front cabinet 1002 at a position closer to the display unit 1 than to the base portion 24.

With the display apparatus 1000 configured as above, the front cabinet 1002 and the rear cabinet 3 interfere with each other in the depth direction when the front cabinet 1002, the rear frame 4, and the rear cabinet 3 are fixed together. This interference produces, on the front cabinet 1002, counterclockwise torque around the fixing portion 25 as viewed in the cross-section illustrated in FIG. 23. As a result, the front cabinet 1002 is warped and deformed, moving the inner periphery 1021 of the front cabinet 1002 closer to the display unit 1 (an outline arrow indicated in FIG. 23), Furthermore, when the inner periphery 1021 of the front cabinet 1002 reaches a position at a predetermined distance from the display unit 1, the cell guide 6 comes into contact with the front cabinet 1002 so that the inner periphery 1021 of the front cabinet 1002 is restrained from further approaching the display unit 1. As a result, the distance between the inner periphery 1021 of the front cabinet 1002 and the display unit 1 is defined to be the predetermined distance.

Thus, the excessive and uneven separation of the front cabinet 1002 is reduced or resolved. It should be noted that the restrained movement of the inner periphery of the front cabinet 1002 toward the display unit 1 helps to prevent deterioration of image quality such as variations in displayed images that is due to the display unit 1 being pressed by the inner periphery 1021 of the front cabinet 1002, for example.

(Variation of Embodiment 4)

The above-described structure of the display apparatus 1000 is a mere example; any modifications conceivable by those skilled in the art may be applied to the detailed portions of the display apparatus as long as the same or similar effects to the above-described effects are obtained.

Some modifications to the detailed portions of the display apparatus according to Embodiment 4 are described below.

Figure 26:
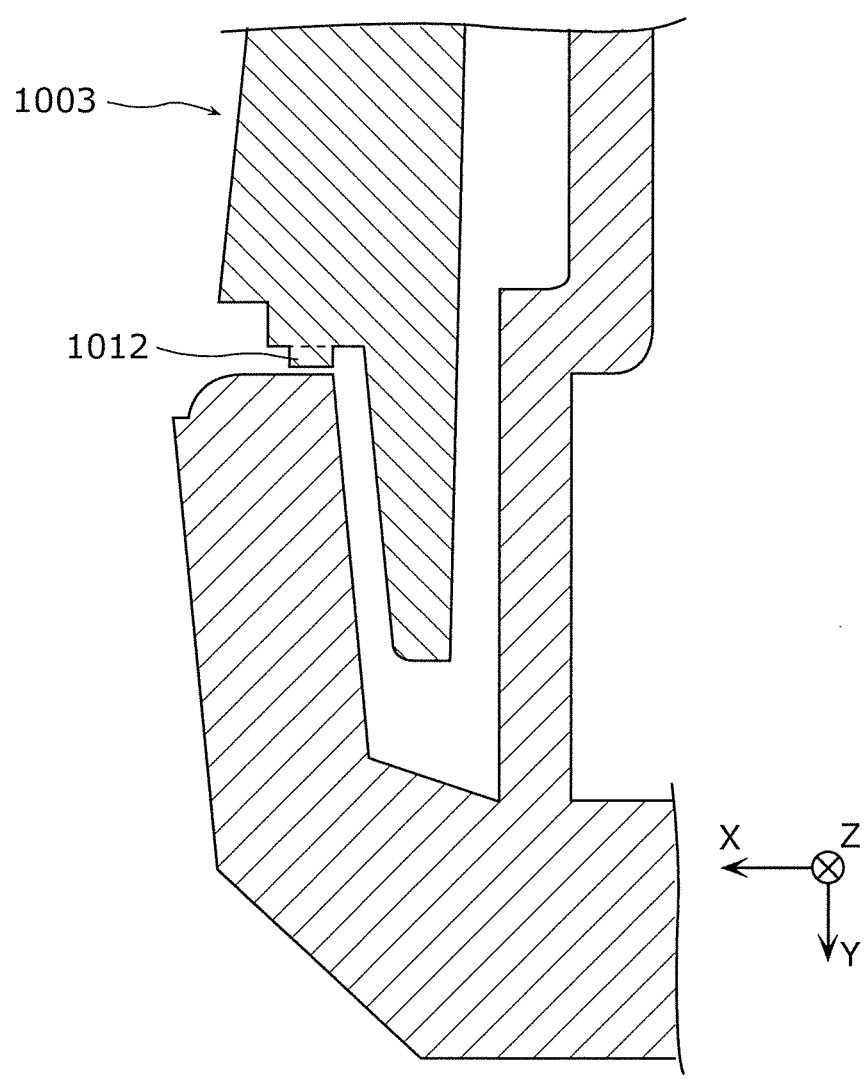
FIG. 26 is a cross-sectional view illustrating an example of the structure of an interference portion according to Variation 1 of Embodiment 4.

FIG. 26 is a cross-sectional view illustrating an example of the structure of an interference portion according to Variation 1 of Embodiment 4.

An interference portion 1012 illustrated in FIG. 26 is provided in a rear cabinet 1003 and is a protrusion having a rectangular cross-section.

Figure 27:
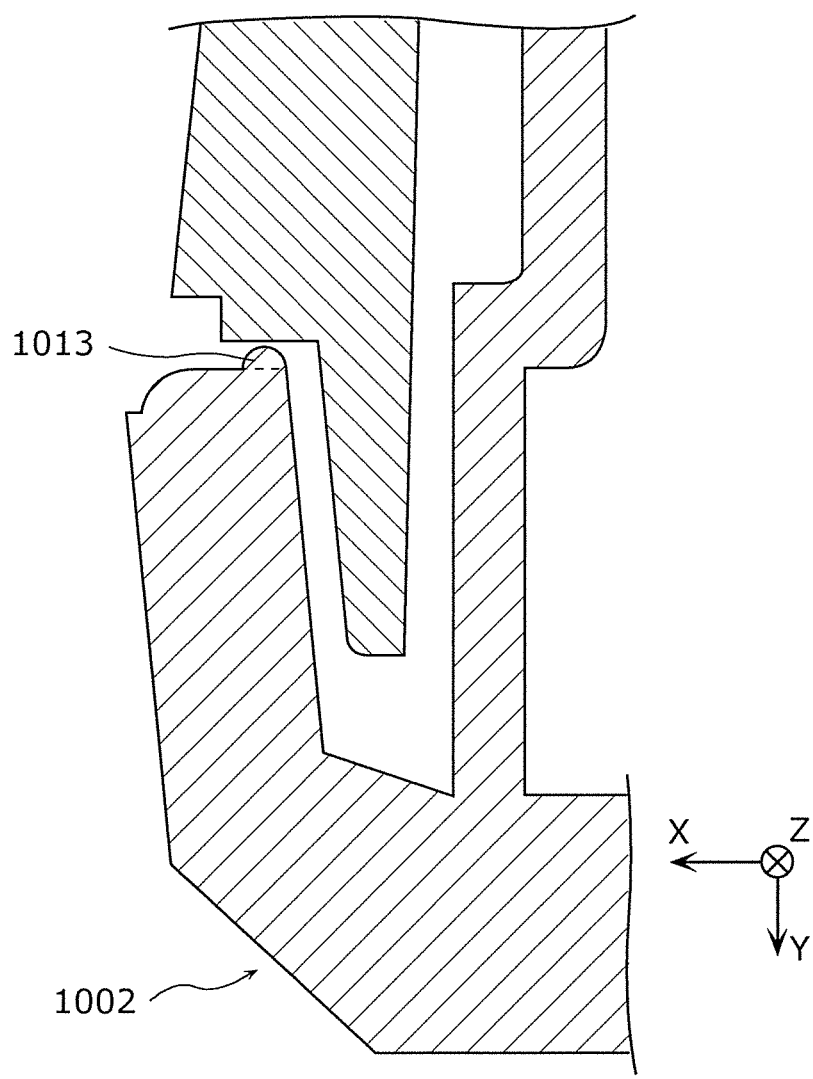
FIG. 27 is a cross-sectional view illustrating an example of the structure of an interference portion according to Variation 2 of Embodiment 4.

FIG. 27 is a cross-sectional view illustrating an example of the structure of an interference portion according to Variation 2 of Embodiment 4.

An interference portion 1013 illustrated in FIG. 27 is provided in a front cabinet 1002 and is a protrusion having a semicircular cross-section.

Figure 28:
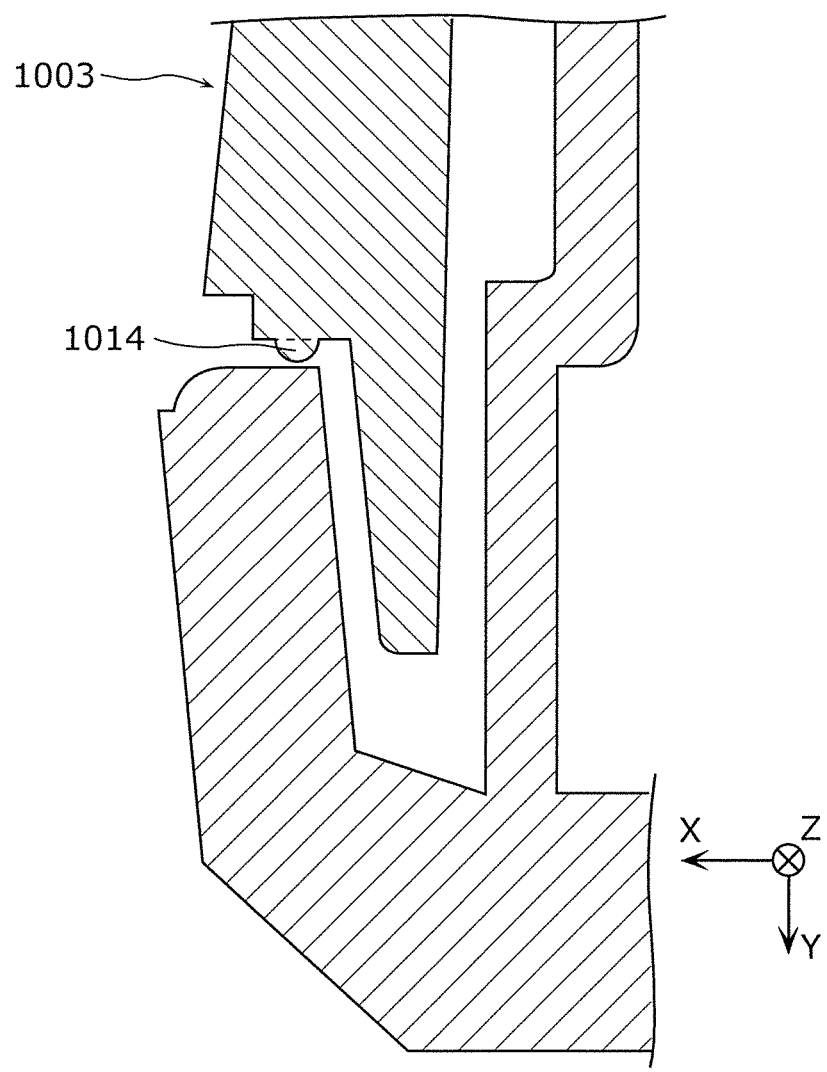
FIG. 28 is a cross-sectional view illustrating an example of the structure of an interference portion according to Variation 3 of Embodiment 4.

FIG. 28 is a cross-sectional view illustrating an example of the structure of an interference portion according to Variation 3 of Embodiment 4.

An interference portion 1014 illustrated in FIG. 28 is provided in a rear cabinet 1003 and is a protrusion having a semicircular cross-section.

Figure 29:
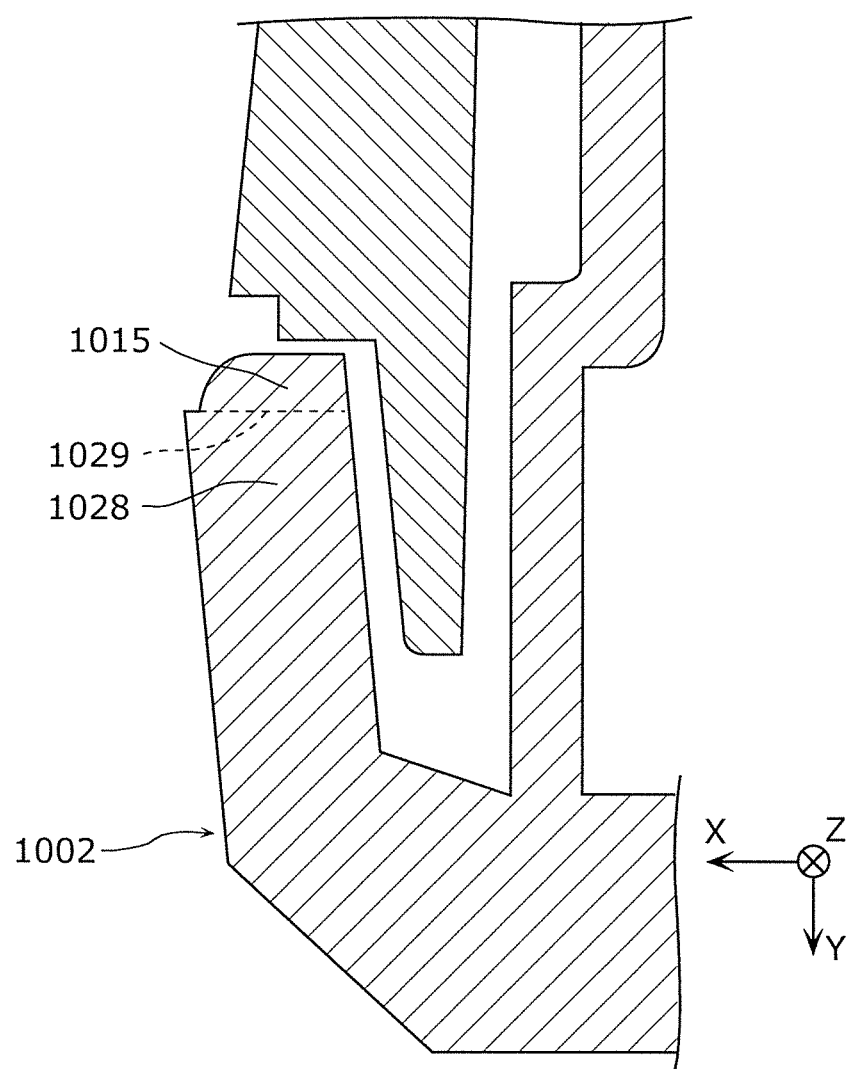
FIG. 29 is a cross-sectional view illustrating an example of the structure of an interference portion according to Variation 4 of Embodiment 4.

FIG. 29 is a cross-sectional view illustrating an example of the structure of an interference portion according to Variation 4 of Embodiment 4.

An interference portion 1015 illustrated in FIG. 29 is a portion of the outer periphery 1028 of the front cabinet 1002 that is located deeper than a dotted line. The interference portion 1015 is provided over the entire width of the end surface of the outer periphery 1028. The dotted line in FIG. 29 indicates a position of the end surface of the outer periphery 1028 of the front cabinet 1002 illustrated in FIG. 24. The interference portion 1015 corresponds to a portion of the front cabinet 1002 illustrated in FIG. 24 that is extended deeper from the end surface of the outer periphery 1028. A height of the interference portion 1015 is defined by a size of the extended portion in the depth direction.

Figure 30:
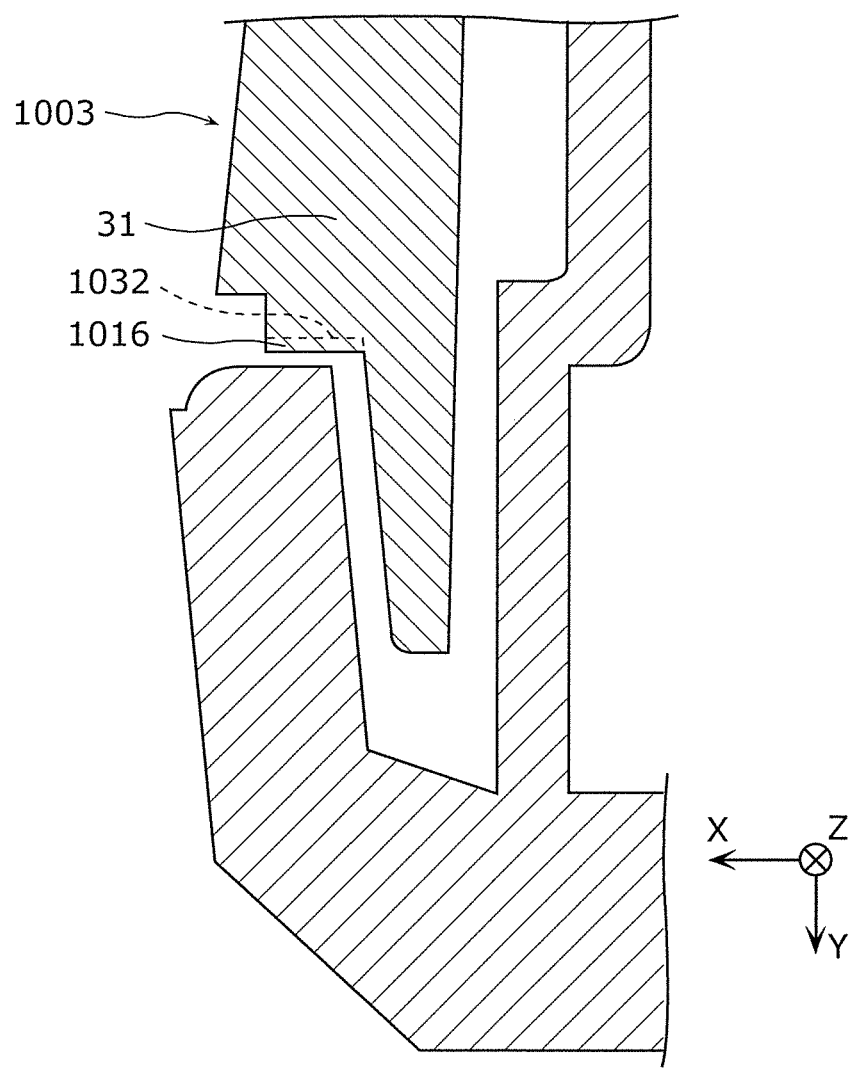
FIG. 30 is a cross-sectional view illustrating an example of the structure of an interference portion according to Variation 5 of Embodiment 4.

FIG. 30 is a cross-sectional view illustrating an example of the structure of an interference portion according to Variation 5 of Embodiment 4.

An interference portion 1016 illustrated in FIG. 30 is a portion of a contiguous portion 1031 in the rear cabinet 1003 that is located before a dotted line. The interference portion 1016 is provided over the entire width of a stepped surface of the contiguous portion 1031. The dotted line in FIG. 30 indicates a position of the stepped surface of the contiguous portion 1031 in the rear cabinet 1003 illustrated in FIG. 26, and the interference portion 1016 corresponds to a portion of the rear cabinet 1003 illustrated in FIG. 26 that is extended forward from the stepped surface of the contiguous portion 1031. A height of the interference portion 1016 is defined by a size of the extended portion in the depth direction.

Also in the display apparatuses with these modifications, the effect of reducing or resolving the excessive and uneven separation of the front cabinet can be obtained by interference between the front cabinet and the rear cabinet.

(Embodiment 5)

A display apparatus according to Embodiment 5 includes an interference portion made up of a plurality of interference portions provided at intervals over the entire circumference of the front cabinet. The display apparatus according to Embodiment 5 is described in detail below.

Figure 31:
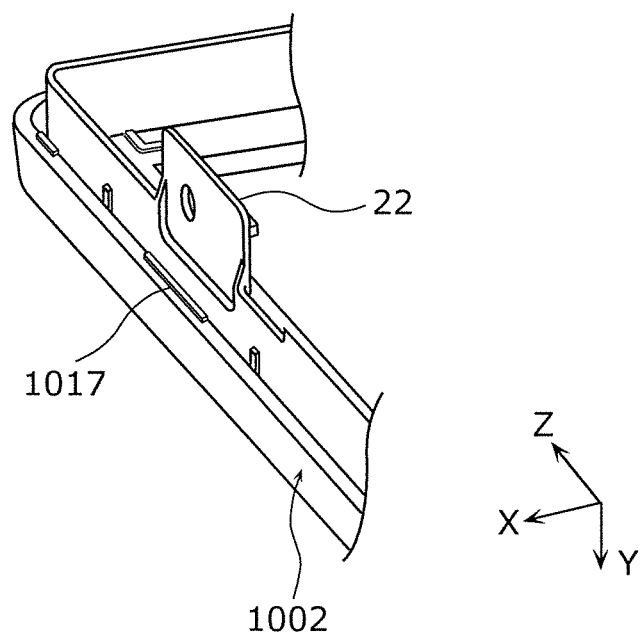
FIG. 31 is a perspective view illustrating an example of the structure of an interference portion according to Embodiment 5.

FIG. 31 is a perspective view illustrating an example of the structure of an interference portion according to Embodiment 5.

An interference portion 1017 illustrated in FIG. 31 is one of the interference portions provided at intervals over the entire circumference of the front cabinet 1002. Out of the illustration, one or more interference portions are provided each of which is the same or similar to the interference portion 1017.

The interference portion 1017 is a protrusion that protrudes in the depth direction from the end surface 1029 of the outer periphery 1028 of the front cabinet 1002. The interference portion 1017 increases in height with distance from the tab 22 of the front cabinet 1002 along an outer edge of the front cabinet 1002.

Figure 32:
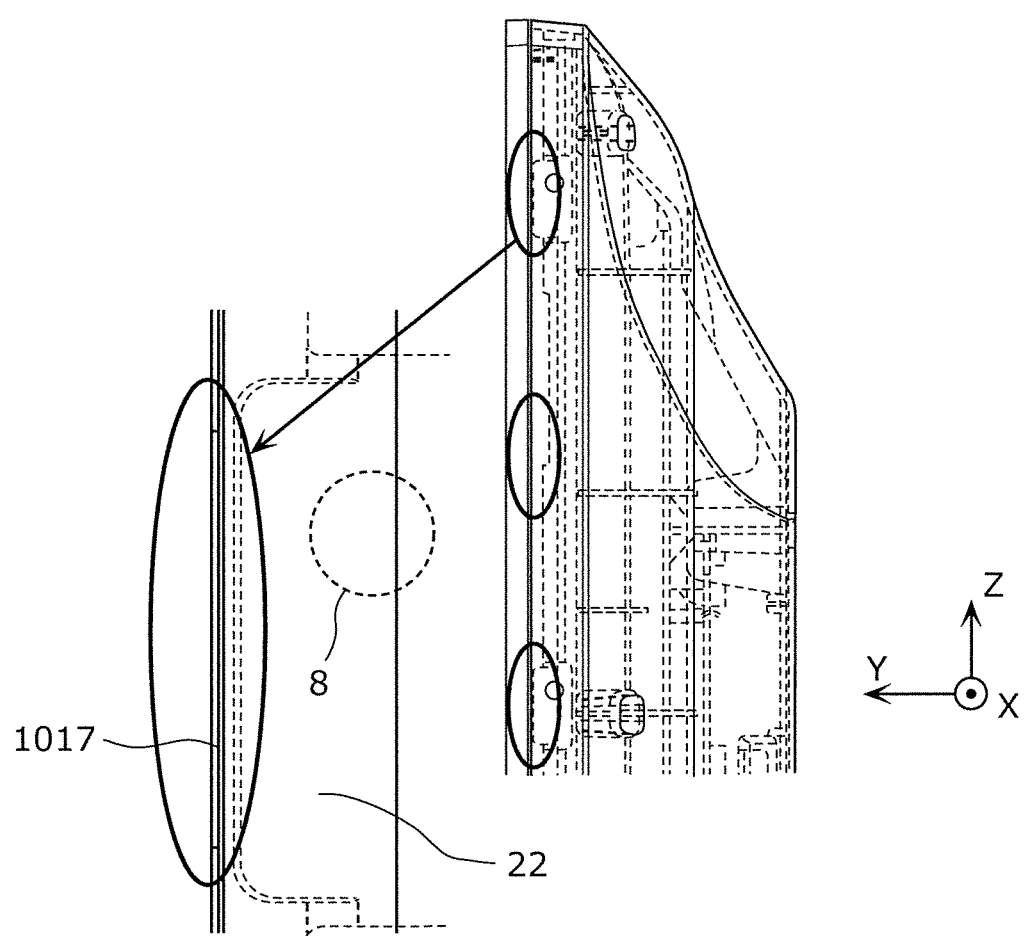
FIG. 32 is a view for explaining a height of an interference portion according to Embodiment 5.

FIG. 32 is a view for explaining the relationship between a height of the interference portion 1017 and a distance from the tab 22 to the interference portion 1017. Among the three interference portions 1017 illustrated in FIG. 32, two interference portions 1017 at both the ends are each positioned near the tab 22, and an interference portion 1017 at the middle is positioned away from the tab 22. In such a layout, the height of the interference portion 1017 at the middle is greater than the height of each of the two interference portions 1017 at both the ends.

With this structure, variations in the displacement on the inner periphery 1021 of the front cabinet 1002, in which the interference portion 1017 farther from the tab 22 causes less displacement on the inner periphery 1021 of the front cabinet 1002, are canceled according to the heights of the interference portions 1017. This allows the inner periphery of the front cabinet 1002 to be more uniformly close to the display unit 1.

The display apparatus has herein been exemplified based on the exemplary embodiments, but the present invention is not limited to these exemplary embodiments. Other embodiments resulting from application of modifications conceivable by those skilled in the art to the exemplary embodiments and any combination of the structural elements in the embodiments are also included in the scope of one or more aspects of the present invention without departing from the essence of the present invention.

INDUSTRIAL APPLICABILITY

The display apparatus according to an aspect of the present invention is applicable as a thin-frame display apparatus including a front cabinet.

The invention claimed is:
1. A display apparatus comprising:
a display unit;
a front cabinet including a frame portion surrounding an outer edge of the display unit; and
a light source housing cabinet placed behind a back surface of the display unit, the back surface being opposite from a display screen of the display unit,
wherein the front cabinet includes a protruding portion extending from the frame portion toward the light source housing cabinet in a first direction substantially perpendicular to the display screen of the display unit,
the protruding portion includes (i) a base portion, (ii) a step or a curve, and (iii) a portion that is spaced from the base portion by the step or the curve,
the portion that is spaced from the base portion by the step or the curve is fixed to the light source housing cabinet with a fastener in a second direction crossing the first direction,
the portion that is spaced from the base portion by the step or the curve is fixed to the light source housing cabinet at a location between a surface of the base portion closest to an outer periphery of the front cabinet and the display unit in the second direction, and the protruding portion includes a lightening portion along a section of an outer edge of the portion that is spaced from the base portion by the step or the curve.

2. The display apparatus according to claim 1, wherein the step or the curve is positioned between the display unit and the light source housing cabinet in the first direction.

3. The display apparatus according to claim 1, further comprising
a cell guide positioned inside the front cabinet and contacting the back surface of the display unit,
wherein the cell guide contacts, in the second direction, the portion that is spaced from the base portion by the step or the curve, and is away from the base portion of the protruding portion.

4. The display apparatus according to claim 1, wherein the lightening portion is at least one of a notch or a slit.

5. The display apparatus according to claim 1, wherein the front cabinet includes an engaging portion that engages the light source housing cabinet.

6. The display apparatus according to claim 1, wherein the protruding portion is formed integrally with the frame portion, and
the portion that is spaced from the base portion by the step or the curve has a through-hole passing through the protruding portion in the second direction, and the fastener is inserted through the through-hole to fix the protruding portion to the light source housing cabinet.

7. The display apparatus according to claim 1, further comprising
a rear cabinet including a contiguous portion which is contiguous with an outer periphery of the front cabinet,
wherein the protruding portion is positioned inside the rear cabinet and located between the outer periphery and the display unit.

8. The display apparatus according to claim 7,
wherein at least a part of the light source housing cabinet is exposed as an exterior of the display apparatus, and
the rear cabinet covers a portion of the protruding portion of the front cabinet at which the protruding portion is fixed to the light source housing cabinet.

9. The display apparatus according to claim 8,
wherein the rear cabinet is made up of a plurality of cabinet sections.

10. The display apparatus according to claim 8, further comprising
a circuit board attached to a back surface of the light source housing cabinet,
wherein the rear cabinet further covers the circuit board.

11. A display apparatus comprising:
a display unit
a front cabinet including a frame portion surrounding an outer edge of the display unit;
a light source housing cabinet placed behind a back surface of the display unit, the back surface being opposite from a display screen of the display unit and
a rear cabinet including a contiguous portion which is contiguous with an outer periphery of the front cabinet,
wherein the front cabinet includes a protruding portion extending from the frame portion toward the light source housing cabinet in a first direction substantially perpendicular to the display screen of the display unit,
the protruding portion includes (i) a base portion, (ii) a step or a curve, and (iii) a portion that is spaced from the base portion by the step or the curve, the portion that is spaced from the base portion by the step or the curve is fixed to the light source housing cabinet with a fastener in a second direction crossing the first direction, the protruding portion is positioned inside the rear cabinet and located between the outer periphery and the display unit, the rear cabinet is fixed to the light source housing cabinet, the outer periphery of the front cabinet includes a facing portion, the contiguous portion of the rear cabinet includes a facing portion, and the facing portion of the outer periphery faces the facing portion of the contiguous portion, and at least one of the facing portion of the outer periphery and the facing portion of the contiguous portion includes an interference protrusion protruding from a surface of the at least one of the facing portion of the outer periphery and the facing portion of the contiguous portion in the first direction which interferes with a surface of the other of the facing portion of the outer periphery and the facing portion of the contiguous portion in the first direction when the front cabinet is fixed to the light source housing cabinet and the rear cabinet is fixed to the light source housing cabinet.

12. The display apparatus according to claim 11, wherein the interference protrusion protrudes toward the other of the facing portion of the outer periphery and the facing portion of the contiguous portion.

13. The display apparatus according to claim 12, wherein the facing portion of the outer periphery and the facing portion of the contiguous portion each extend in a form of a ring that surrounds the display unit, and the interference protrusion is provided over an entire circumference of the at least one of the facing portion of the outer periphery and the facing portion of the contiguous portion.

14. The display apparatus according to claim 13, wherein the interference protrusion is made up of a plurality of protrusions provided at intervals, and the protrusions increase in height with distance from the protruding portion of the front cabinet along an outer edge of the front cabinet.

15. The display apparatus according to claim 11, further comprising a cell guide positioned inside the front cabinet and holding the display unit, wherein when an inner periphery of the front cabinet reaches a position at a predetermined distance from the display unit due to interference in the facing portion of the outer periphery and the facing portion of the contiguous portion, the cell guide comes into contact in the first direction with a portion of the frame portion that extends from the base portion of the protruding portion toward the display unit.

16. A display apparatus comprising:

a display unit;

a front cabinet including a frame portion surrounding an outer edge of the display unit; and a light source housing cabinet placed behind a back surface of the display unit, the back surface being opposite from a display screen of the display unit, wherein the front cabinet includes a protruding portion extending from the frame portion toward the light source housing cabinet in a first direction substantially perpendicular to the display screen of the display unit, the protruding portion is fixed to the light source housing cabinet with a fastener in a second direction crossing the first direction, the protruding portion is fixed to the light source housing cabinet at a portion that is located between a base portion of the protruding portion and the display unit in the second direction, and the protruding portion includes a lightening portion along a section of an outer edge of the portion at which the protruding portion is fixed to the light source housing cabinet.

* * * * *